United States Patent [19]

Smith et al.

[11] Patent Number: 5,796,772
[45] Date of Patent: Aug. 18, 1998

[54] MULTI-BAND, MULTI-MODE SPREAD-SPECTRUM COMMUNICATION SYSTEM

[75] Inventors: Douglas G. Smith, Arlington, Va.; Robert C. Dixon, Palmer Lake; Jeffrey S. Vanderpool, Colorado Springs, both of Colo.

[73] Assignee: Omnipoint Corporation, Colorado Springs, Colo.

[21] Appl. No.: 485,987

[22] Filed: Jun. 7, 1995

Related U.S. Application Data

[63] Continuation-in-part of Ser. No. 293,671, Aug. 18, 1994, which is a continuation-in-part of Ser. No. 146,492, Nov. 1, 1993, abandoned, and Ser. No. 59,021, May 4, 1993, abandoned, which is a continuation-in-part of Ser. No. 976,700, Nov. 16, 1992, abandoned, and Ser. No. 206,045, Mar. 1, 1994, abandoned, which is a continuation of Ser. No. 948,293, Sep. 18, 1992, Pat. No. 5,291,516, which is a continuation of Ser. No. 698,694, May 13, 1991.

[51] Int. Cl.$^6$ .............................. H04K 1/00; H04L 27/00; H04L 5/16
[52] U.S. Cl. .............................. 375/200; 375/259; 375/219; 455/422
[58] Field of Search ........................ 375/219, 220, 375/260, 374, 376, 200, 259; 455/33.1, 54.1, 86, 188.1, 266, 303–306, 422, 31.2, 403; 379/59, 60; 327/105

[56] References Cited

U.S. PATENT DOCUMENTS

| | | | |
|---|---|---|---|
| 2,154,921 | 4/1939 | Vroom | 375/275 |
| 2,844,650 | 7/1958 | Dutton | 375/275 |

(List continued on next page.)

FOREIGN PATENT DOCUMENTS

| | | | |
|---|---|---|---|
| 3984485 | 9/1985 | Australia | H04B 7/26 |
| 0189695 | 6/1986 | European Pat. Off. | H04B 7/26 |
| 0326104 | 2/1989 | European Pat. Off. | H04Q 7/26 |
| 3126333 | 5/1991 | Japan | H04B 7/26 |
| 8700370 | 1/1987 | WIPO | H04J 13/00 |
| 9315573 | 8/1993 | WIPO | J04J 13/00 |
| 9318601 | 9/1993 | WIPO | H04J 27/30 |
| 9406217 | 3/1994 | WIPO | H04B 7/005 |
| 9503652 | 2/1995 | WIPO | H04B 7/26 |
| 9506365 | 3/1995 | WIPO | H04B 7/04 |

OTHER PUBLICATIONS

Kavehrad, M. et al., *Performance of Low–Complexity Channel Coding and Diversity for Spread Spectrum in Indoor, Wireless Communication*, AT&T Tech. Journal, 64(8): 1927–1965, Oct. 1985.

Unkauf, Manfred G., "Surface Wave Devices in Spread Spectrum Systems", reprinted in H. Matthews (ed.), *Surface Filters*, pp. 477–509 (Wiley 1977).

Omnipoint Corp Voice, *Comments on Winforum Spectrum Etiquette*, Dated: Aug. 28, 1993.

(List continued on next page.)

*Primary Examiner*—Tesfaldet Bocure
*Attorney, Agent, or Firm*—Lyon & Lyon LLP

[57] ABSTRACT

A technique for spread-spectrum communication which uses more than one mode and more than one frequency band. Selectable modes include narrowband mode and spread-spectrum mode, or cellular mode and microcellular mode. Selectable frequency bands include both licensed and unlicensed frequency bands, particularly frequency bands including the 902–928 MHz, 1850–1990 MHz, and 2.4–2.4835 GHz frequency bands. Spread-spectrum communication channels are 10 MHz or less in width. The frequency band onto which spread-spectrum signals are encoded may be changed upon a change in environment or other control trigger, such as establishment or de-establishment of communication with a private access network. A multi-band transmitter comprises a single frequency synthesizer and a frequency source (e.g., a local oscillator), coupled to a selectable band pass filter. A multi-band receiver capable of monitoring one or more frequency bands comprises bank of bandpass filters and a demodulator comprising a single frequency synthesizer and a frequency source.

25 Claims, 9 Drawing Sheets

U.S. PATENT DOCUMENTS

| | | | |
|---|---|---|---|
| 3,358,227 | 12/1967 | Taylor | 324/57 |
| 3,628,155 | 12/1971 | Muzzi . | |
| 3,988,679 | 10/1976 | Clarke et al. . | |
| 3,991,419 | 11/1976 | Thomas . | |
| 4,100,498 | 7/1978 | Aslup et al. | 328/14 |
| 4,132,952 | 1/1979 | Hongu et al. . | |
| 4,163,944 | 8/1979 | Chambers et al. | 325/446 |
| 4,164,628 | 8/1979 | Ward et al. | 179/15 BA |
| 4,189,677 | 2/1980 | Cooper et al. | 325/321 |
| 4,222,115 | 9/1980 | Cooper et al. | 375/1 |
| 4,247,942 | 1/1981 | Hauer | 375/25 |
| 4,280,222 | 7/1981 | Flower | 375/38 |
| 4,285,060 | 8/1981 | Cobb et al. | 375/1 |
| 4,301,530 | 11/1981 | Gutleber | 370/1 |
| 4,320,514 | 3/1982 | Haskell | 375/1 |
| 4,324,001 | 4/1982 | Rhodes | 375/90 |
| 4,327,438 | 4/1982 | Baier et al. | 375/1 |
| 4,355,399 | 10/1982 | Timor | 375/80 |
| 4,355,411 | 10/1982 | Reudink et al. | 455/33 |
| 4,356,567 | 10/1982 | Eguchi et al. . | |
| 4,392,231 | 7/1983 | Henry | 375/76 |
| 4,408,350 | 10/1983 | Donath . | |
| 4,418,425 | 11/1983 | Fennel et al. | 455/27 |
| 4,423,519 | 12/1983 | Bennett et al. | 375/80 |
| 4,425,642 | 1/1984 | Moses et al. | 370/76 |
| 4,425,661 | 1/1984 | Moses et al. | 375/1 |
| 4,432,089 | 2/1984 | Wurzburg et al. | 370/110.1 |
| 4,435,821 | 3/1984 | Ito et al. | 375/1 |
| 4,455,651 | 6/1984 | Baran | 370/104 |
| 4,456,793 | 6/1984 | Baker et al. | 179/99 R |
| 4,479,226 | 10/1984 | Prabhu et al. | 375/1 |
| 4,479,227 | 10/1984 | Bjornholt | 375/1 |
| 4,484,028 | 11/1984 | Kelley et al. | 179/2 DP |
| 4,525,835 | 7/1985 | Vance et al. | 370/29 |
| 4,554,668 | 11/1985 | Deman et al. | 375/1 |
| 4,587,662 | 5/1986 | Langewellpott | 375/1 |
| 4,630,283 | 12/1986 | Schiff | 375/1 |
| 4,672,658 | 6/1987 | Kavehrad et al. | 379/63 |
| 4,688,210 | 8/1987 | Eizenhöfer et al. | 370/18 |
| 4,701,904 | 10/1987 | Darcie | 370/3 |
| 4,703,474 | 10/1987 | Foschini et al. | 370/18 |
| 4,718,080 | 1/1988 | Serrano et al. | 379/59 |
| 4,724,435 | 2/1988 | Moses et al. | 340/870.13 |
| 4,736,371 | 4/1988 | Tejima et al. | 370/95 |
| 4,742,512 | 5/1988 | Akashi | 370/96 |
| 4,748,642 | 5/1988 | Bertsche | 455/188.1 |
| 4,754,453 | 6/1988 | Eizenhofer | 370/95 |
| 4,754,473 | 6/1988 | Edwards | 379/58 |
| 4,765,753 | 8/1988 | Schmidt | 379/60 |
| 4,797,677 | 1/1989 | MacDoran et al. | 342/352 |
| 4,797,947 | 1/1989 | Labedz | 455/33 |
| 4,804,938 | 2/1989 | Rouse et al. | 340/310 |
| 4,807,222 | 2/1989 | Amitay | 370/85 |
| 4,811,357 | 3/1989 | Betts | 375/1 |
| 4,815,106 | 3/1989 | Propp et al. | 375/36 |
| 4,837,786 | 6/1989 | Gurantz et al. | 370/20 |
| 4,837,802 | 6/1989 | Higashiyama et al. | 379/62 |
| 4,864,589 | 9/1989 | Endo | 375/1 |
| 4,866,732 | 9/1989 | Carey et al. | 375/1 |
| 4,868,795 | 9/1989 | McDavid et al. | 367/77 |
| 4,878,238 | 10/1989 | Rash et al. | 379/62 |
| 4,893,327 | 1/1990 | Stern et al. | 379/59 |
| 4,901,307 | 2/1990 | Gilhousen et al. | 370/18 |
| 4,905,221 | 2/1990 | Ichiyoshi | 370/18 |
| 4,928,274 | 5/1990 | Gilhousen et al. | 370/92 |
| 4,943,973 | 7/1990 | Werner | 375/1 |
| 4,955,083 | 9/1990 | Phillips et al. | 375/270 |
| 4,972,431 | 11/1990 | Keegan | 364/604 |
| 4,979,170 | 12/1990 | Gilhousen et al. | 375/1 |
| 4,984,247 | 1/1991 | Kaufmann et al. | 375/1 |
| 4,989,230 | 1/1991 | Gillig . | |
| 4,995,083 | 2/1991 | Baker | 380/23 |
| 5,005,183 | 4/1991 | Carey et al. | 375/1 |
| 5,008,925 | 4/1991 | Pireh | 379/60 |
| 5,008,953 | 4/1991 | Dahlin et al. | 455/33 |
| 5,016,255 | 5/1991 | Dixon et al. | 375/1 |
| 5,016,260 | 5/1991 | Masuda | 375/66 |
| 5,018,165 | 5/1991 | Sohner et al. | 375/1 |
| 5,022,046 | 6/1991 | Morrow | 375/1 |
| 5,022,047 | 6/1991 | Dixon et al. | 375/1 |
| 5,023,939 | 6/1991 | Hori . | |
| 5,025,452 | 6/1991 | Sohner et al. | 375/1 |
| 5,029,184 | 7/1991 | Andren et al. | 375/1 |
| 5,042,050 | 8/1991 | Owen et al. | 375/1 |
| 5,042,082 | 8/1991 | Dahlin | 455/33 |
| 5,056,109 | 10/1991 | Gilhousen et al. | 375/1 |
| 5,058,138 | 10/1991 | Figura et al. | 375/88 |
| 5,063,560 | 11/1991 | Yerbury | 370/18 |
| 5,073,899 | 12/1991 | Collier et al. | 375/1 |
| 5,073,900 | 12/1991 | Mallinkrodt | 375/1 |
| 5,081,642 | 1/1992 | O'Clock et al. | 375/1 |
| 5,093,840 | 3/1992 | Schilling | 375/1 |
| 5,101,501 | 3/1992 | Gilhousen et al. | 455/33 |
| 5,103,459 | 4/1992 | Gilhousen et al. | 375/1 |
| 5,107,225 | 4/1992 | Wheatley et al. | 330/279 |
| 5,109,390 | 4/1992 | Gilhousen et al. | 375/1 |
| 5,111,535 | 5/1992 | Tokunaga | 375/1 |
| 5,115,514 | 5/1992 | Leslie | 455/9 |
| 5,127,042 | 6/1992 | Gillig et al. | 379/59 |
| 5,142,534 | 8/1992 | Simpson et al. . | |
| 5,150,377 | 9/1992 | Vannucci | 375/1 |
| 5,153,598 | 10/1992 | Alves | 342/352 |
| 5,157,686 | 10/1992 | Omura et al. | 375/1 |
| 5,166,929 | 11/1992 | Lo | 370/85.3 |
| 5,166,952 | 11/1992 | Omura et al. | 375/1 |
| 5,175,867 | 12/1992 | Wejke et al. | 455/33.1 |
| 5,179,571 | 1/1993 | Schilling | 375/1 |
| 5,185,762 | 2/1993 | Schilling | 375/1 |
| 5,193,101 | 3/1993 | McDonald et al. | 375/1 |
| 5,195,090 | 3/1993 | Bollinger et al. | 370/94.1 |
| 5,195,091 | 3/1993 | Farwell et al. | 370/49.1 |
| 5,210,771 | 5/1993 | Schaeffer et al. | 375/1 |
| 5,218,618 | 6/1993 | Sagey | 375/200 |
| 5,222,075 | 6/1993 | Richley | 375/1 |
| 5,224,120 | 6/1993 | Schilling | 375/1 |
| 5,228,053 | 7/1993 | Miller | 375/1 |
| 5,231,646 | 7/1993 | Heath et al. | 375/1 |
| 5,253,268 | 10/1993 | Omura et al. | 375/1 |
| 5,260,988 | 11/1993 | Schellinger et al. . | |
| 5,263,045 | 11/1993 | Schilling | 375/1 |
| 5,263,047 | 11/1993 | Kotzin | 375/1 |
| 5,263,079 | 11/1993 | Umemoto | 379/58 |
| 5,274,665 | 12/1993 | Schilling | 375/1 |
| 5,280,472 | 1/1994 | Gilhousen | 370/18 |
| 5,280,537 | 1/1994 | Sugiyama | 375/1 |
| 5,285,469 | 2/1994 | Vanderpool | 375/1 |
| 5,289,497 | 2/1994 | Jacobson et al. | 375/1 |
| 5,291,516 | 3/1994 | Dixon | 375/1 |
| 5,299,228 | 3/1994 | Hall | 375/200 |
| 5,303,393 | 4/1994 | Noreen et al. | 455/54.2 |
| 5,313,457 | 5/1994 | Hostetter et al. | 370/18 |
| 5,315,583 | 5/1994 | Murphy et al. | 375/200 |
| 5,319,634 | 6/1994 | Bartholomew et al. | 370/18 |
| 5,341,396 | 8/1994 | Higgings et al. | 375/1 |
| 5,347,284 | 9/1994 | Volpi et al. | 342/356 |
| 5,351,269 | 9/1994 | Schilling | 375/1 |
| 5,353,303 | 10/1994 | Walthall | 375/1 |
| 5,392,287 | 2/1995 | Tiedemann et al. | 370/95.1 |
| 5,400,359 | 3/1995 | Hikoso et al. | 375/1 |
| 5,402,413 | 3/1995 | Dixon | 370/18 |
| 5,410,568 | 4/1995 | Schilling | 375/205 |
| 5,416,779 | 5/1995 | Barnes et al. | 370/29.1 |

| | | | |
|---|---|---|---|
| 5,416,797 | 5/1995 | Gilhousen et al. | 375/705 |
| 5,434,859 | 7/1995 | Levardon | 370/84 |
| 5,434,888 | 7/1995 | Fukuchi | 375/307 |
| 5,438,329 | 8/1995 | Gastouniotis et al. | 340/870.02 |
| 5,442,680 | 8/1995 | Schellinger et al. | |
| 5,444,696 | 8/1995 | Petranovich | 370/17 |
| 5,454,028 | 9/1995 | Hara et al. | 379/61 |
| 5,455,822 | 10/1995 | Dixon | 370/18 |
| 5,469,468 | 11/1995 | Schilling | 375/200 |
| 5,471,463 | 11/1995 | Hulbert | 375/200 |
| 5,471,509 | 11/1995 | Wood et al. | 375/350 |
| 5,481,533 | 1/1996 | Honig et al. | 370/18 |
| 5,487,083 | 1/1996 | Nakajima et al. | 375/200 |
| 5,497,424 | 3/1996 | Vanderpool | 380/34 |
| 5,506,837 | 4/1996 | Söllner et al. | 370/31 |
| 5,511,233 | 4/1996 | Otten | 455/56.1 |
| 5,533,011 | 7/1996 | Dean et al. | 370/18 |
| 5,548,616 | 8/1996 | Mucke et al. | 375/205 |

OTHER PUBLICATIONS

Letter to William Caton from Omnipoint, Re: *Personal Communication Service/Pioneer Issues*, Dated: Sep. 29, 1993.

In The Matter of: Amendment of the Commission's Rules to Establish New Personal Communications Services—*Comments*, Received: Jan. 3, 1994.

Joint Technical Committee on Wireless Access—JTC(Air) Draft PCS2000 Standard (*PN–3390*) Date: Sep. 23, 1994.

Kavehrad, M. et al, *Spread Spectrum for Indoor Digital Radio*, IEEE Communications Magazine, Jun. 1987, vol. 25, No. 5, at 32–40.

Collins, J.H. et al., *The Role of Surface Acoustic Wave Technology in Communication Systems*, Ultrasonics, Mar. 1972, Vol. 10, No. 2, pp. 59–71.

Kavehrad, Mohsen et al., *Direct Sequence Spread Spectrum with DPSK Modulation and Diversity for Indoor Wireless Communications*, IEEE Transactions on Communications, Feb. 1987, vol. COM–35, No. 2, pp. 224–226.

Ruprecht, Jurg, *Code Time Division Multiple Access: A Method for the Orthological of CDMA Signals in Multipath Environment*, Aachener Kolloquium "Signal theorie", Mobile Kommunikation Systems, Mar. 1994, pp. 1–8.

Saleh, Adel A.M. et al., *An Experimental TDMA Indoor Radio Communications System Using Slow Frequency Hopping and Coding*, IEEE Transactions on Communications, Jan. 1991, vol. 39, No. 1, pp. 152–161.

Dixon, Robert C., *Spread Spectrum Systems with Commercial Applications* (J. Wiley & Sons, 3d ed. 1994).

Shaft, Paul D., *Low–Rate Convolutional Code Applications in Spread Spectrum Communications*, IEEE Transactions on Communications, vol. Com–25, No. 8., Aug. 1977, pp. 815–821.

Campbell, Colin K., *Applications of Surface Acoustice and Shallow Bulk Acoustic Wave Devices*, Proceedings of the IEEE, Oct. 1989, pp. 1453–1484.

Dixon, Robert C., *Spread Spectrum Systems*, (J. Wiley & Sons, 2d ed. 1984).

Radio Equipment and Systems Digital European Cordless Telecommunications (DECT) Reference document, ETR 015, Mar. 1991.

European digital cellular telecommunications system (phase 1); Mobile Station—Base Station System (MS–BSS) interface data link layer specification, I–ETS 300 021, May 1992.
European digital cellular telecommunications system (phase 1); MS–BSS layer 1—General Requirements, I–ETS 300 078, May 1992.

Mohanty, Nirode C., *Spread Spectrum and Time Division Multiple Access Satellite Communications*, IEEE Transactions on Communications, vol. Com–25, No. 8, Aug. 1977, pp. 810–815.

In the Matter of: Amendment of the Commission's Rules to Establish New Personal Communications Services—*Tentative Decision and Memorandum Opinion and Order* Released: Nov. 6, 1992.

In the Matter of: Amendment of the Commission's Rules to Establish New Personal Communications Services—*Comments of Omnipoint Communications, Inc.* Dated: Nov. 9, 1992.

In the Matter of: Amendment of the Commission's Rules to Establish New Personal Communications Services—*Reply Comments of Omnipoint on 1850–1990 MHz Personal Communications Services* Dated: Jan. 8, 1993.

In the Matter of: Redevelopment of Spectrum to Encourage Innovation in the Use of New Telecommunications Technologies—*Reply Comments of Omnipoint Communications, Inc.* Dated: Jan. 13, 1993.

In the Matter of: Amendment of the Commission's Rules to Establish New Personal Communications Services—*Reply Comments of Omnipoint Communications Inc.* Dated: Mar. 1, 1993.

In the Matter of: Amendment of the Commission's Rules to Establish New Personal Communications Services—*Third Report and Order* Released: Feb. 3, 1994.

In the Matter of: Amendment of the Commissions' Rules to Establish New Personal Communications Services—*Adelphia Comm. Corp.—Satcom, Inc.* Dated: Jun. 25, 1992.

In the Matter of: Request of Omnipoint Communications, Inc. For a Pioneer's Preference in the Licensing Process for Personal Communications Services—*Request for a Pioneer's Preference* Dated: May 4, 1992.

In the Matter of: Amendment of the Commission's Rules to Establish New Personal Communications Services, A Request for a Pioneer's Preference for Personal Communications Services, Requested by Omnipoint Mobile Data Company—*Request for Pioneer's Preference* Dated: May 4, 1992.

In the Matter of: Omnipoint Corporation, Oracle Data Publishing, Inc., and McCaw Cellular Communications, Inc.—*Request For a Pioneer's Preference* Dated: May 4, 1992.

In the Matter of Omnipoint Corporation Amendment of the Commission's Rules to Establish New Personal Communications Services—*Semi–Annual Experimental License Progress Report* Aug. 1993.

Omnipoint Corporation *Progress Report*—(Submitted with respect to Omnipoint's 1850–2200MHz Experimental License KK2XCV, File No. 2174–EX–PL–91) Dated: Jul. 8, 1992.

Joint Technical Committee on Wireless Access (JTC) *Omnipoint Candidate Air Interface Solution* Date: Nov. 1, 1993.

Joint Technical Committee on Wireless Access—JTC(Air) *Standards Contribution* (*Air Interface Standards Project*) Date: Mar. 21, 1994.

Omnipoint Corporation—*FCC Experimental License Semi–annual Progress Report* Apr. 1992.

Omnipoint Corporation—*FCC Experimental License Semi–annual Progress Report* Rev. 01 May 1992.

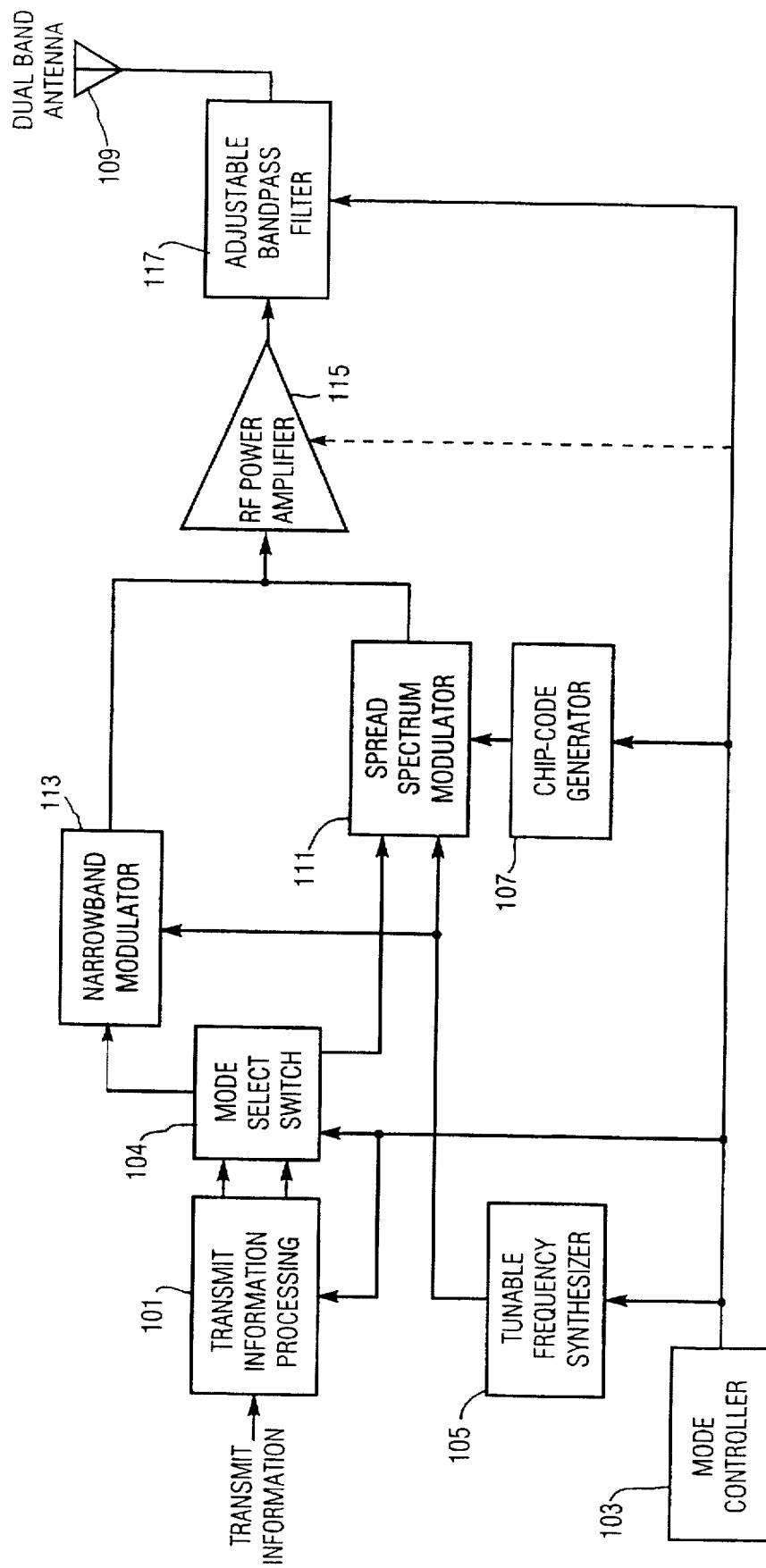

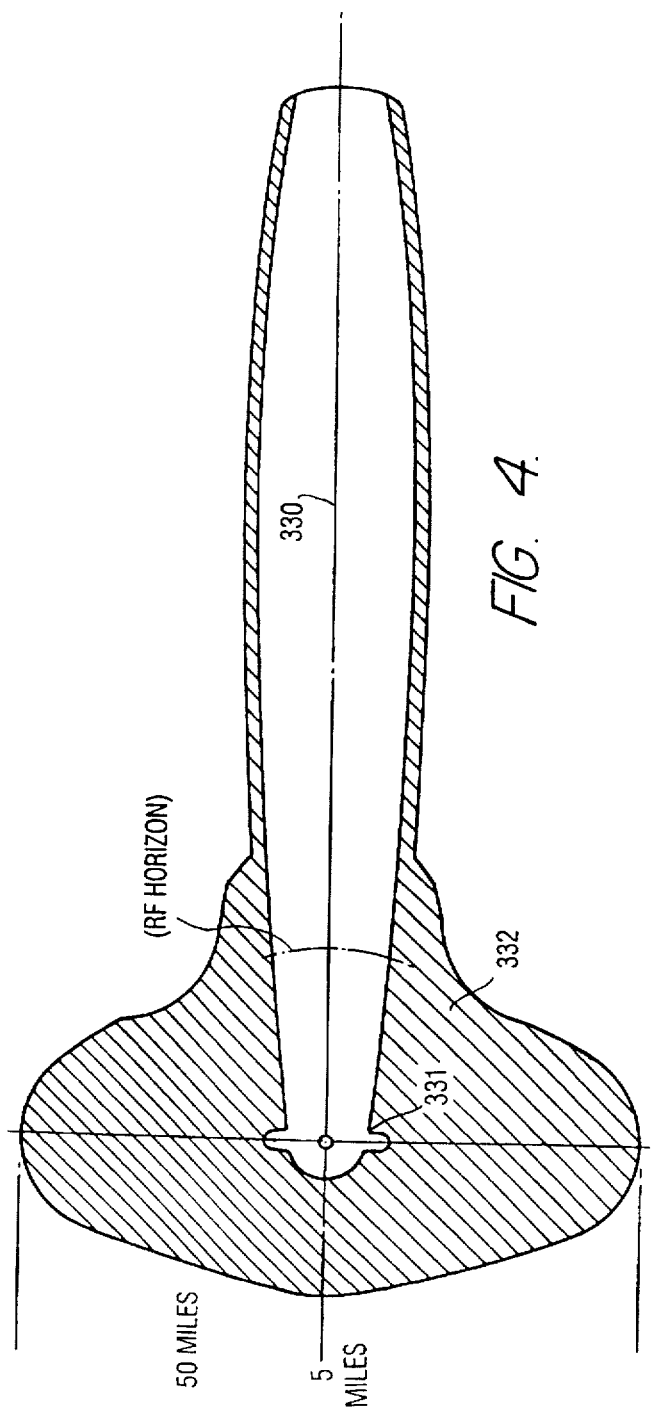
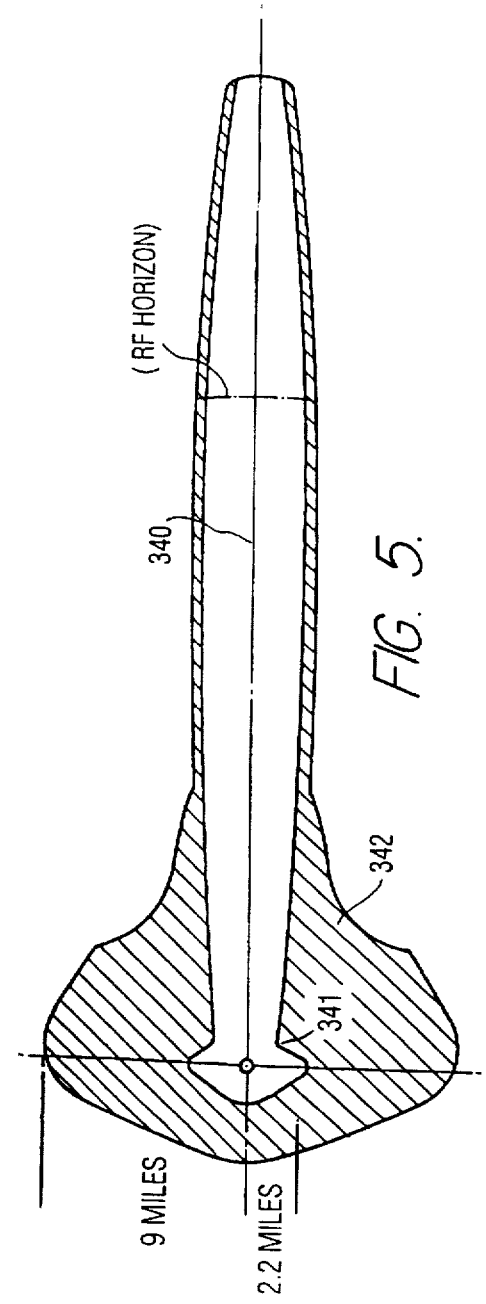

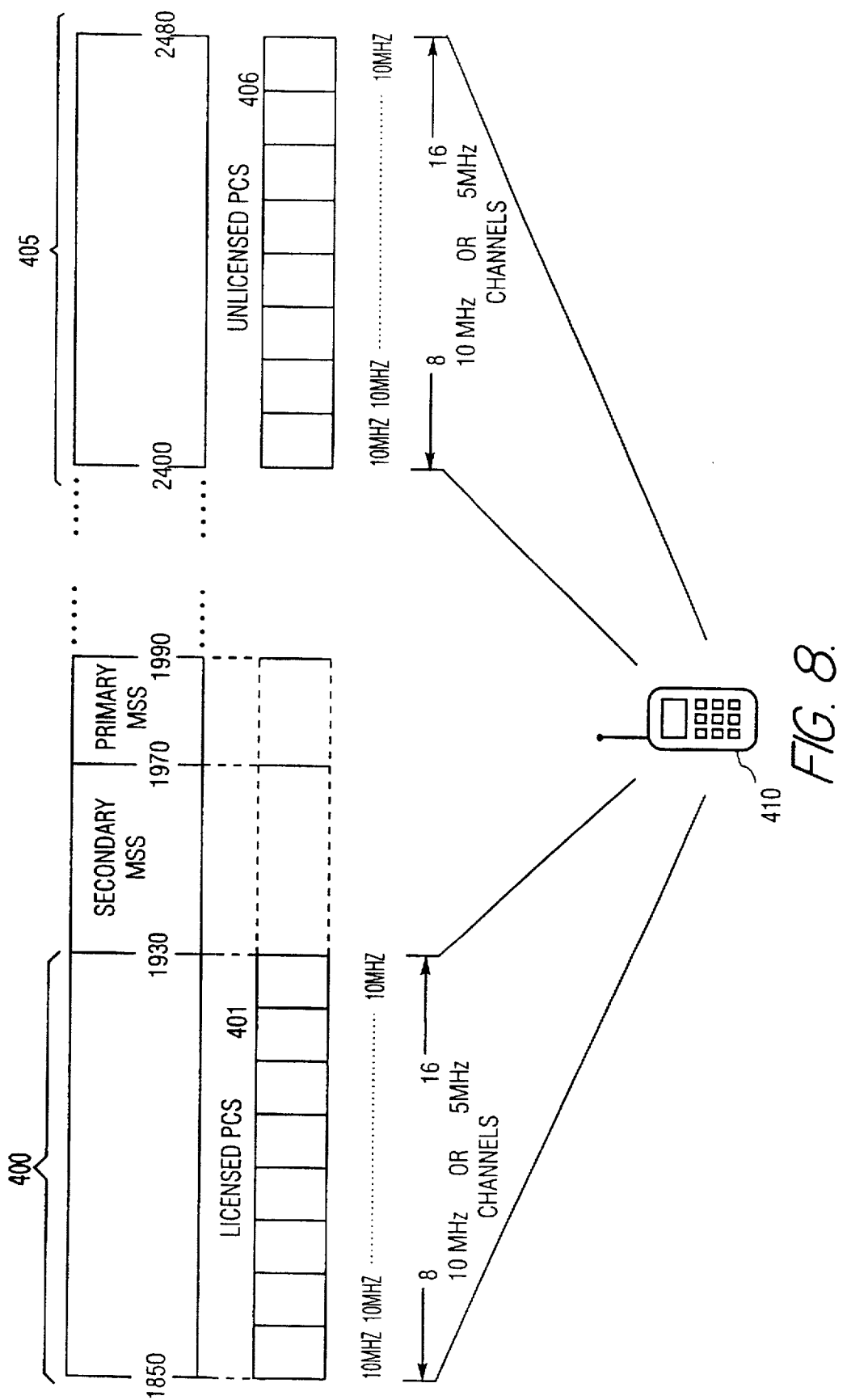

MULTI-BAND, MULTI-MODE SPREAD-SPECTRUM COMMUNICATION SYSTEM

CROSS-REFERENCE TO RELATED APPLICATIONS

This application is a continuation-in-part of application Ser. No. 08/293,671 filed on Aug. 18, 1994, which is in turn a continuation-in-part of application Ser. No. 08/146,492 filed on Nov. 1, 1993 abandoned, and application Ser. No. 08/059,021 filed May 4, 1993 abandoned, (which is a continuation-in-part of Ser. No. 07/976,700 filed Nov. 16, 1992 and application Ser. No. 08/206,045 filed on Mar. 1, 1994 abondoned, (which is a continuation of Ser. No. 07/948,293 filed on Sep. 18, 1992, and now issued as U.S. Pat. No. 5,291,516, which is a file-wrapper continuation of Ser. No. 07/698,694 filed May 13, 1991, each of which is hereby incorporated by reference as if fully set forth herein.

BACKGROUND OF THE INVENTION

1. Field of the Invention

This invention relates to spread-spectrum communication and, more particularly, to a communication system using multiple communication modes over multiple frequency bands.

2. Description of Related Art

Cellular telephony has been well known for many years, but with its growing popularity, more channels in the allocated cellular frequencies have become necessary. Among the proposed advances in the art have been a move from frequency division multiple access (FDMA) systems using narrowband analog communication to digital voice communication using traditional narrowband FDMA techniques possibly coupled with time division multiple access (TDMA) techniques. Further proposed advances include the use of code division multiple access (CDMA) techniques such as spread spectrum systems. Examples of communication protocols include IS-45, IS-95, DCS1900 (otherwise known as GSM), DECT (Digital European Cordless Telephone), and AMPS.

Another approach to the problem of allowing increased numbers of users in a geographic location is the concept of personal communications systems, or PCN's, which utilize microcells. A microcell is similar to a cell in a traditional cellular system, except much smaller. Where a traditional cell may cover an area of several square miles, a microcell may only be a few hundred feet in diameter. By limiting transmit power, more microcells, and thus more users, may be co-located in a geographic area.

Prior art does not teach a method for operation of a single telephone which has the ability to function both as a narrowband frequency, time, and/or code division multiplexed cellular phone, as well as a microcellular telephone utilizing time, frequency, or code division multiplexing, where the cellular and microcellular functions either share the same frequency bands of operation or are offset from each other. Nor does the prior art teach such a system where the microcellular mode may employ a paging unit independent of the unit's telephone functionality.

For purposes of the present specification, "analog voice" is described as a system where an analog voice system directly modulates a radio frequency (RF) carrier or intermediate frequency (IF) signal, and digital voice is described as a system where the signal is first digitized, and possibly compressed through any number of methods common and well known in the art, and whose digital signal is then used for RF carrier or IF modulation. A narrow band modulation typically uses amplitude modulation (AM) or frequency modulation (FM), and has a bandwidth between 3 kHz and 30 kHz.

In spread-spectrum communication, the spread-spectrum signal which is generated and transmitted has a spreading bandwidth which exceeds the bandwidth of the data stream. When using spread-spectrum techniques for wireless communication, it may be necessary to avoid or minimize interference with other users of the electromagnetic spectrum. Some examples of such other users are microwave communication users (such as the Operational Fixed Services ("OFS") using microwave communication towers) and cellular communication users (such as those using cellular telephones). In particular, OFS services are critical to controlling, among other things, the nation's electric power grid, which makes the possibility of inadvertent OFS disruption extremely serious. Accordingly, it would be advantageous to avoid or minimize interference with microwave and cellular communication users.

In wireless communication, the transmitted signal may be subject to various forms of frequency-selective fading, which may cause the signal to fade or drop out over a localized range of frequencies. Although spread-spectrum signals are distributed over a wider range of frequencies than narrowband signals, they may also be subject to frequency-selective fading over a portion of their spreading bandwidth. Accordingly, it would be advantageous to mitigate the effect of frequency-selective fading.

Spread-spectrum modulation in more than one frequency band can be difficult due to the wide separation between frequency bands. For example, operation in the 900 megahertz and 1800 megahertz bands could require a synthesizer capable of covering approximately 1,000 megahertz in frequency spectrum. However, in hand-held equipment such as telephones, it is undesirable to use more than one synthesizer, or even more than one oscillator, due to increased cost, weight, and related considerations. Accordingly, it would be advantageous to provide a spread-spectrum system in which a single, relatively narrow, synthesizer would serve more than one operating frequency band.

SUMMARY OF THE INVENTION

The invention provides in one aspect a transmitter and receiver capable of operating in a plurality of frequency bands and/or in a plurality of modes, making use of either narrowband or spread-spectrum communication techniques. The invention may be embodied as a cellular or cordless telephone which utilizes frequency division multiplexing, time division multiplexing, code division multiplexing, or various combinations thereof. In one embodiment, the invention possesses both cellular and microcellular functionality, wherein transmission and/or reception may occur using either narrowband or spread-spectrum signals in conjunction with either FDMA, TDMA, or CDMA techniques, or any combination thereof. A system in accordance with the present invention may have two or more modes, such as a cellular mode and a microcellular mode, or such as a spread-spectrum mode and a narrowband mode, and the various modes may occupy common frequency bands, overlapping frequency bands, or distinct, offset frequency bands.

Another aspect of the invention provides a technique for spread-spectrum communication which reduces interference from microwave and cellular communication users, especially when transmitting in a communication band generally used by those users. In particular, said embodiment provides a spread-spectrum technique having a spreading bandwidth of about 10 MHz or less, in combination with a known center frequency. The known center frequency may be within a microwave communication band or a cellular communication band.

Another aspect of the invention provides a technique for spread-spectrum communication which uses more than one frequency band, particularly unlicensed frequency bands, including the 902–928 MHz, 1850–1990 MHz, and 2.4–2.4835 GHz frequency bands, and including the 1910–1930 MHz frequency band or other future unlicensed frequency bands. In said embodiment, the frequency band onto which spread-spectrum signals are encoded may be changed upon a change in environment or other control trigger, such as establishment or de-establishment of communication with a private access network.

The invention may be embodied as a transmitter generally comprising a switch, a tunable-frequency synthesizer, one or more modulators, a dual-band power amplifier (where the dual modes occupy distinct frequency bands) or a single-band power amplifier (where the dual modes occupy single, contiguous, or closely placed distinct bands), and an adjustable bandpass filter. The switch may be used to select either narrowband or spread-spectrum modulation, or may be used to select one of a plurality of frequency bands for transmission. If narrowband mode is selected, a narrowband modulator modulates an input signal, combines it with a carrier frequency generated by the tunable frequency synthesizer, and provides an output to the power amplifier and the adjustable bandpass filter for transmission. If spread-spectrum mode is selected, the input signal is provided to a spread-spectrum modulator for generating a spread-spectrum signal. The spread-spectrum signal is combined with a carrier frequency generated by the tunable frequency synthesizer and provided to the power amplifier and the adjustable bandpass filter for transmission. The adjustable bandpass filter may be tuned, and the power amplifier switched, where distinct, offset frequencies are employed for the two operating modes.

The invention may also be embodied as a receiver generally comprising a switch, a tunable-frequency synthesizer, a tunable bandpass filter, a preamplifier, a frequency converter, an IF amplifier, and one or more demodulators. The receiver generally operates in reverse fashion from the transmitter, whereby the mode select switch is used to select between narrowband or spread-spectrum reception. If in narrowband mode, the adjustable bandpass filter may be adjusted to a narrow bandwidth for passing a received narrowband signal, while in a spread-spectrum mode the adjustable bandpass filter may be adjusted to a wide bandwidth for passing a received spread-spectrum signal. The bandpass filter also is tunable, where different frequencies are utilized for distinct modes, and the preamplifier may also be switch selected or tuned to the appropriate band where the dual modes employ distinct, separated frequency band. The received signal is converted to an IF signal using a local oscillator signal from the tunable-frequency synthesizer, and the IF signal is demodulated by either the spread-spectrum demodulator or the narrowband demodulator depending on the chosen mode.

The invention further provides in another aspect a dual-band spread-spectrum modulator which uses a single, relatively narrow, synthesizer to serve two operating frequency bands. In the lower frequency band, the synthesizer may operate in a high-side injection mode, while in the higher frequency range, the synthesizer may operate in a low-side injection mode. In one embodiment, the lower frequency range may comprise about 1850 to 1990 megahertz, while the higher frequency range may comprise about 2400 to 2483.5 megahertz.

Additional objects and advantages of the invention will be set forth in part in the description which follows, and may be obvious from the description or learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 2 is a block diagram of a dual-mode transmitter according to the invention;

FIGS. 4 and 5 are illustrations comparing exclusion zones around a microwave beampath;

FIGS. 8 and 9 are diagrams showing an allocation of frequency bands;

DESCRIPTION OF THE PREFERRED EMBODIMENTS

Figure 1:
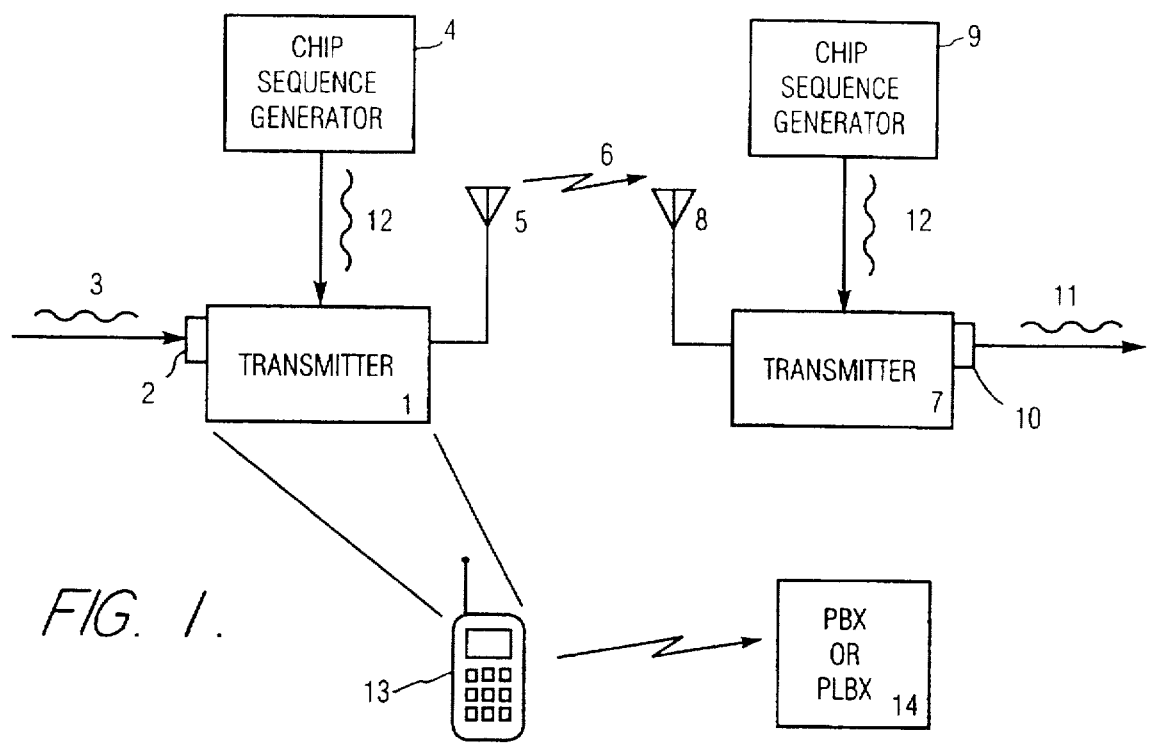
FIG. 1 is a block diagram of a spread-spectrum communication transmitter and receiver.

Reference will now be made in detail to the present preferred embodiments of the invention, examples of which are illustrated in the accompanying drawings, wherein like reference numerals indicate like elements throughout the several views. The disclosure of the invention may be supplemented by the contents of technical information appended to this specification in a technical appendix, hereby incorporated by reference as if fully set forth herein. No admission is made as to possible prior art effect of any part of the appendix.

Modern and proposed cellular telephone systems currently utilize high power, frequency, time, and/or code division multiplexed narrowband radio frequency communication techniques in conjunction with large cells to establish and maintain telephone communications. With the growing popularity of these systems, increased user capacity is required within a geographical area. One approach to providing increased capacity is microcells, which utilize comparatively much smaller cells as well as low power radio frequency techniques.

Traditional cellular systems have proven to be highly capital intensive in base station installations, on the order of several hundred thousand dollars per cell site, and therefore demand high operational and access fees. Proposed microcell systems would require a much lower capital investment per cell at a small fraction of cellular site installation cost, such that shop owners and other small operators could have a cell site easily installed on their premises. Microcells potentially may be located in public access areas, airports, restaurants, shopping malls, banks, service stations, etc., as well as commercial or office facilities (utilizing wireless PBX, centrex, or key systems), and residential sites. A microcell user, thus, could utilize the same handset at home, in the office, or at most other public places where he or she typically would need access to telephone communications, in a cost effective way, and maintain a single telephone number. Public operational and access charges to the user could then be much lower, likely on the order of pay phone charges per call, not per minute.

A disadvantage of microcellular systems is their potential lack of incoming call accessibility. Potentially, one cannot place a call into the system to the remote user. Studies have been performed, however, that estimate that up to 80% of all calls made in traditional cellular systems are from the user outbound from the microcell user, and not inbound to the user. Even with no inbound access to the wireless microcell user, a potentially large market exists which has little need for incoming access, where users would be willing to surrender incoming call access for the savings of a microcellular pager in the microcell handheld unit, which can provide for a level of incoming access to the user in the public environment.

Another disadvantage of microcells is practical handoff capabilities from cell to cell. Since the cells in a microcell system are small, the system becomes impractical to use from a moving vehicle since the user potentially could be passing through cells every few seconds, making handoffs impractical. Microcellular systems may be designed such that there is no handoff capability between cells, which would provide for a wireless pay phone type of system. Since microcells are so small, system use in remote areas would be impractical due to the number of cell installations necessary to provide complete coverage.

The present invention provides, in one embodiment, a dual-mode transmitter and receiver which achieves advantages of both systems, i.e. the range and mobility of traditional cellular, and the low cost of microcellular. The dual-mode transmitter and receiver include a dual-mode cordless telephone which has as its first mode operational capabilities which allow cellular functionality, and a second mode which allows for micro-cellular operation. Functionality in the first, or cellular, mode includes a relatively high power cellular telephone employing analog or digital voice techniques in conjunction with frequency, and/or time division traditional narrowband radio techniques. Functionality in the second, or microcellular, mode includes a low power microcellular telephone using digital voice techniques in conjunction with frequency, time and/or code division spread spectrum radio techniques, where the cellular and microcellular functions either share the same frequency bands, or are offset from each other.

FIG. 1 shows a block diagram of a spread-spectrum communication transmitter and receiver.

A spread-spectrum transmitter 1 comprises an input port 2 for input data 3, a chip sequence transmitter generator 4, and a transmitting antenna 5 for transmitting a spread-spectrum signal 6. A spread-spectrum receiver 7 comprises a receiver antenna 8, a chip sequence receiver generator 9, and an output port 10 for output data 11. A chip sequence 12 may be identically generated by both the transmitter generator 4 and the receiver generator 9, and appears essentially random to others not knowing the spreading code upon which it is based. The spread-spectrum signal 6 may have a spreading bandwidth which exceeds the bandwidth of the input data 3. The spread-spectrum signal 6 may also be modulated onto a communication channel having a center frequency, with the center frequency and the spreading bandwidth substantially defining a communication channel. The communication channel may also have a known signal dropoff for energy outside the limits of the channel. An extensive discussion of spread-spectrum communication, spreading codes, and chip sequences, may be found in R. Dixon, SPREAD-SPECTRUM SYSTEMS (2d ed. 1984).

In the exemplary arrangement shown in FIG. 2, a dual-mode transmitter in accordance with various aspects of the present invention is shown comprising an antenna 109, a mode controller 103, a mode select switch 104, transmitter-information processing means 101, a tunable-frequency synthesizer 105, a chip-code generator 107, a spread-spectrum modulator 111, a narrowband modulator 113, a power amplifier 115, and an adjustable bandpass filter 117. The transmitter-information means may be embodied as an information device 101. The information device 101 may include source encoders such as Golay encoders, error correction coding, analog-to-digital converters, etc.

The spread-spectrum modulator 111 is coupled to the information device 101 through mode select switch 104, the tunable-frequency synthesizer 105 and the chip-code generator 107. The narrowband modulator 113 is coupled to the information device 101 through mode select switch 104, and the tunable-frequency synthesizer 105. The power amplifier 115 is coupled to the mode controller 103, the spread-spectrum modulator 111 and the narrowband modulator 113. The adjustable, tunable, bandpass filter 117 is coupled to the antenna 109, the power amplifier 115 and the mode controller 103.

Narrowband or spread-spectrum modulation is selected using the mode controller 103. The information device 101 processes the input information signal, while the tunable-frequency synthesizer 105 generates a carrier signal, and the chip-code generator 107 generates a chip-code signal.

The mode controller 103 controls a mode select switch 104 which directs the processed information signal to the narrowband modulator 113 or the spread-spectrum modulator 111. The spread-spectrum modulator 111 modulates the carrier with the processed information signal and the chip-code signal as a spread-spectrum signal, when the mode select switch 104 has been selected for spread-spectrum modulation. The narrowband modulator 113 modulates the carrier with the processed information signal as a narrowband modulated signal, when the mode select switch 104 is selected for narrowband modulation.

When the mode controller 103 is set to narrowband modulation, the power amplifier 115 amplifies the narrowband modulated signal. Where the dual modes function in distinct frequency bands, the power amplifier 115 may either be wideband enough to function in both bands, or may be adjustable to function in the band pertaining to the mode in operation, with mode controller 103 controlling its operation accordingly. When the mode controller 103 is set to spread-spectrum modulation, the power amplifier 115 amplifies the spread-spectrum signal. Similarly, with a narrowband modulation setting of the mode controller 103, the adjustable bandpass filter 117 has a bandwidth adjusted to a narrow bandwidth and corresponding frequency for passing the narrowband modulated signal. With a spread-spectrum setting of the mode controller 103, the adjustable bandpass filter 117 has a bandwidth adjusted to a wide bandwidth and corresponding frequency for passing the spread-spectrum signal.

Figure 3:
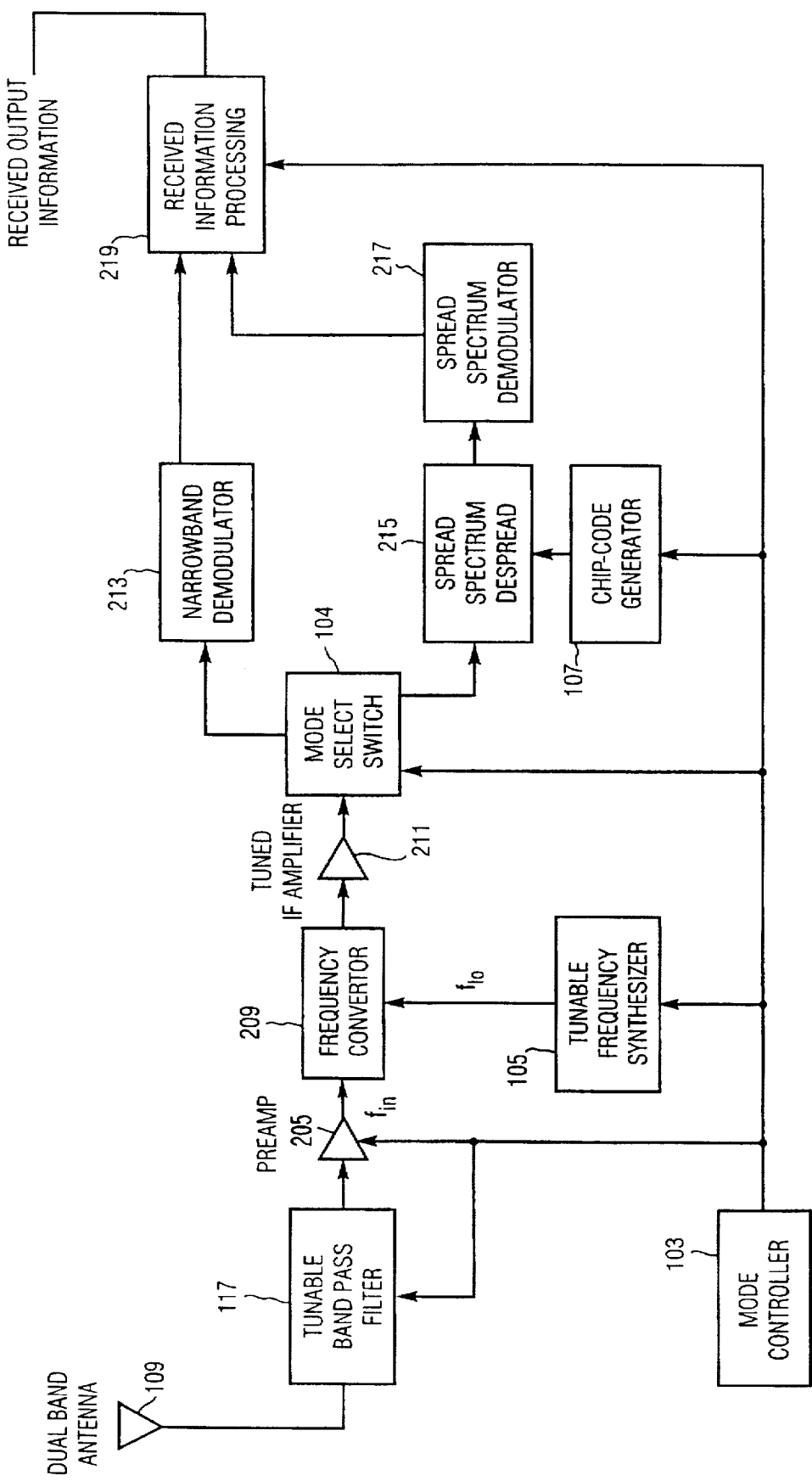
FIG. 3 is a block diagram of a dual-mode receiver according to the present invention.

The present invention, as illustrated in FIG. 3, also includes an embodiment as a dual-mode receiver. The dual-mode receiver may comprise a mode controller 103, a tunable-frequency synthesizer 105, a chip-code generator 107, an antenna 109, an adjustable bandpass filter 117, a preamplifier 205, a frequency converter 209, an IF amplifier 211, a mode select switch 104, a spread-spectrum despreader 215, a spread-spectrum demodulator 217, a narrowband demodulator 213, and receiver-information processing means. The receiver-information means is embodied as a receiver-information processing device 219. The adjustable bandpass filter 117, is coupled to the antenna 201 and to the mode controller 103. The preamplifier 205 is coupled to the adjustable bandpass filter 117 and to the mode controller 103. The frequency converter 209 is coupled to the preamplifier 205 and the tunable-frequency synthesizer 105. The IF amplifier 211 is coupled to the frequency converter 209. The spread-spectrum despreader 215 is coupled to the chip-code generator 107 and through the mode select switch 104 to the IF amplifier 211. The spread-spectrum demodulator 217 is coupled to the spread-spectrum despreader 215. The narrowband demodulator 213 is coupled through the mode controller 103 to the IF amplifier 211.

As with the dual-mode transmitter of FIG. 2, the mode controller 103 is used to select reception of narrowband or spread-spectrum modulation. The tunable-frequency synthesizer 105 generates a local oscillator signal, and the chip-code generator 107 generates a reference chip-code signal for comparison with the received chip code signal.

When the mode controller 103 is set to narrowband modulation, the adjustable bandpass filter 117 is adjusted to a narrow bandwidth and corresponding frequency for passing the narrowband modulated signal. With a spread-spectrum setting of the mode controller 103, the adjustable bandpass filter 117 is adjusted to a wide bandwidth and corresponding frequency for passing the spread-spectrum signal. The preamplifier 205 amplifies the filtered narrowband modulated signal when the mode controller 103 is set to the narrowband modulation setting, and amplifies the filtered spread-spectrum signal when the mode controller is set to the spread-spectrum modulation setting and is switch selectable to the appropriate band for each mode where the dual mode occupy non-contiguous or widely separated frequency bands. The frequency converter 209 converts using the local oscillator signal, the filtered narrowband modulated signal and the filtered spread-spectrum signal to an IF signal.

FIGS. 2 and 3 illustrate the implementation of a dual-band, dual-mode transmitter and receiver, respectively, for use in any narrowband application with capability to switch to a separate frequency band while employing spread spectrum modulation/demodulation in the alternate operating band.

Operation of the dual-band transmitter of FIG. 2 is as follows. Using transmitter-information processing device 101, input information may be filtered, analog-to-digital (A/D) converted if required, as determined by the mode switch control, and applied to either a narrowband or spread spectrum modulation process. Narrowband modulation is employed in a narrowband mode and spread spectrum modulation employed in a spread-spectrum mode. In either mode, the modulated carrier is applied to the dual-band RF power amplifier 115.

The tunable frequency synthesizer 105, which provides the proper carrier for either conventional narrowband or spread spectrum mode, is controlled by the mode switch controller 103, outputting only one of possibly many required transmit carrier frequencies for modulation at any one time.

After amplification, the proper modulated carrier signal, either conventional narrowband or spread spectrum, is applied to an adjustable, tunable bandpass filter 117 and then to the antenna 109. The pass band and frequency of the adjustable bandpass filter 117 is selected by the mode controller 103. This is necessary to meet transmission spurious signal level control standards.

A single, dual-band antenna 109 then acts as a transducer to convert the electrical RF signal from the power amplifier 115 and adjustable bandpass filter 117 to an electromagnetic signal for propagation to the receiver.

The mode controller 103 also controls the operation of a reference code generated by chip-code generator 107. The reference code is used as a spectrum-spreading function in the spread spectrum mode. The chip-code generator 107 would not operate in the conventional narrowband mode.

This transmitter configuration is applicable to any desired dual mode system in which one mode is used in a conventional narrowband system, such as cellular telephones, while a second mode is employed for communicating with a spread spectrum system.

Receiver operation of the receiver in FIG. 3 is as follows. A received signal is converted by the antenna 109 from an electromagnetic signal to an electrical signal. The antenna 109 may or may not be common to the transmitter. The received signal is then applied to an adjustable bandpass filter 117, which may or may not be common to the transmitter, and which is controlled by the mode controller 103. The adjustable bandpass filter 203 selects the proper conventional narrowband or spread spectrum operating signal and passes it through a preamplifier 205, whose output is applied to a frequency converter 209.

The other input to the frequency converter 209 is a local oscillator signal generated by a tunable frequency synthesizer 105 whose frequency in turn is controlled by the mode controller 103. The input signal is converted to an intermediate frequency (IF), which may be the same for either conventional narrowband or for spread spectrum signals. The receiver is assumed to be the superheterodyne type, and is illustrated as a single conversion receiver, but may also be implemented by a dual or multi-conversion superheterodyne receiver without a change in the overall system's operation.

An output signal from the frequency synthesizer 105 is multiplied with the amplified input signal from the preamplifier 205 selected by the input filter, in frequency converter 209 to produce the intermediate frequency signal. A tuned, fixed frequency IF amplifier 211 amplifies the received signal and applies it to a mode select switch 104 whose output is coupled to either the conventional narrowband signal demodulator 213 or the spread-spectrum signal despreader 215. The despreader 215 uses a reference code provided by the chip-code generator 107 to facilitate proper spread spectrum signal selection and despreading. This reference code is controlled by the mode controller 103, and may be common to the transmitter shown in FIG. 2.

The spread-spectrum despreader 215 despreads, using the reference chip-code signal, the IF signal as a digitally modulated signal. The spread-spectrum demodulator 217 demodulates the digitally modulated signal as a digitally demodulated signal. The narrowband demodulator 213 demodulates the filtered narrowband modulated signal as a demodulated signal. The receiver-information device 219 processes the demodulated signal as an information signal.

Spread spectrum signals, after being despread, are demodulated by a spread-spectrum demodulator 217, separate from the narrowband demodulator 213. This is necessary because of the difference in conventional signal information modulation of the carrier is typically analog FM, while spread spectrum signals may employ digital modulation and may be digital-to-analog (D/A) converted prior to processing. If the narrowband technique used employs digital modulation, a second narrowband D/A demodulator, similar to the spread spectrum demodulator, may be employed, or the spread spectrum demodulator may be eliminated and D/A demodulation, which may be identical for both narrowband and spread spectrum modulation, may be included as a function of the received information processor.

After despreading, spread-spectrum demodulator 217 output signals are processed, using receiver-information device 219, by filtering, digital-to-analog conversion, and amplification, as necessary, to convert it to a form that is usable to the information output destination. Processing is selected by the mode switch control 103.

As in the transmitter of FIG. 2, more than two modes can be supported by the same general receiver configuration of FIG. 3. This includes operation at multiple frequencies, use of multiple codes, multiple modulation formats, or time-sequential selection of operating mode.

The following illustrate application of aspects of the present invention, for particular modulation schemes.

One embodiment of the invention includes a telephone whose first mode comprises analog voice techniques and traditional cellular frequency division multiplexed operation employing, but not limited to, narrowband radio frequency modulation techniques, such as FM, and whose second mode comprises microcellular operation including, but not limited to, digital voice commanding and/or compression techniques coupled with spread spectrum radio frequency modulation, and/or time and/or frequency division multiplexing techniques, where the cellular and microcellular modes occupy common frequency bands. The microcellular mode also may include a paging function, which may utilize narrowband or spread spectrum technologies, and occupy frequency bands common to the cellular and microcellular modes, or may be offset from both or either, and may be independent of the unit's telephone functionality.

Another embodiment of the invention includes a telephone whose first mode comprises cellular frequency division multiplexed operation employing, but not limited to, narrowband radio frequency modulation techniques, such as FM, coupled with digital voice commanding and/or compression and/or time division multiplexing techniques, and whose second mode comprises microcellular operation including, but not limited to, digital voice compendium and/or compression techniques coupled with spread spectrum radio frequency modulation, and/or time and/or frequency division multiplexing techniques, where the cellular and microcellular modes occupy common or distinct frequency bands. The microcellular mode may also include a paging function, which may utilize narrowband or spread spectrum technologies, and may occupy frequency bands common to the cellular and microcellular modes, or may be offset from both or either, and may be independent of the unit's telephone functionality.

It will be apparent to those skilled in the art that various modifications can be made to the described transmitter and receiver configurations without departing from the scope or spirit of the invention, and it is intended that the present invention cover modifications and variations of the techniques shown herein provided that they come within the scope of the appended claims and their equivalents.

As previously noted with respect to FIG. 1, a spread-spectrum signal 6 may have a spreading bandwidth which exceeds the bandwidth of the input data 3. The spread-spectrum signal 6 may also be modulated onto a communication channel having a center frequency, with the center frequency and the spreading bandwidth substantially defining a communication channel, and the communication channel may have a known signal dropoff for energy outside the limits of the channel. It has been found by the inventors that a particular set of selected values for the spreading bandwidth and the center frequency provide a substantial and surprising advantage when using spread-spectrum techniques for wireless communication.

In particular, it has been found by the inventors that a spreading bandwidth of about 10 megahertz (MHz) or less offers several advantages in spread-spectrum wireless communication. These advantages include:

- minimizing interference with microwave communication users when transmitting in a microwave communication band such as the 1850–1990 MHz communication band;
- minimizing interference with, and maximizing compatibility with, cellular communication users when transmitting in a cellular communication band such as the cellular communication bands near 800–900 MHz and other cellular communication bands;
- mitigating the effect of frequency-selective fading when transmitting using a spread-spectrum technique;
- allowing the same spread-spectrum technique to be used in other communication bands, such as the 90–928 MHz band and the 2400–2483.5 MHz band; and
- other and further advantages which are detailed in, and which would appear from, the technical appendix to those of ordinary skill in the art, after perusal of the specification, drawings and claims.

Using a 10 MHz or smaller band for spread spectrum communication when transmitting within a microwave communication band (such as the 1850–1990 MHz communication band) minimizes interference with microwave communication users in several ways. As a general matter, interference avoidance is a function of both geography and frequency selection. Typically, microwave communication is directed over a beampath between a microwave transmitter and receiver. Because microwave stations provide critical services such as, for example, controlling the nation's electric power grid, the possibility of inadvertent disruption of such services extremely serious. Accordingly, government regulations typically require that microwave stations such as licensed OFS receivers cannot be required to tolerate more than a set level (e.g., 1 dB) of interference in their areas of operation. Users of the microwave frequency bands within the geographic area of licensed microwave stations therefore cannot operate in a zone which would cause more than 1 dB of interference to the microwave station. This zone may be referred to as an exclusion zone.

FIGS. 4 and 5 show examples of exclusion zones for a specific traditional narrowband communication technique as compared to a specific type of spread spectrum communication technique. FIG. 4 compares the size of exclusion zones 331 and 332 around a microwave beampath 330 under a theoretical freespace loss model. As can be seen in FIG. 4, the exclusion zone 332 for narrowband communication may be far larger than the exclusion zone 331 for spread spectrum communication. It can also be seen that the exclusion zones 331 and 332 extend farthest in the direction of the beampath 330. With respect to other directions, the exclusion zones 331 and 332 extend relatively farther out at 90 degrees to the beampath 330, but are relatively closer, for example, in the direction opposite the beampath 330 and at various other angles as depicted in FIG. 4.

In a similar manner, FIG. 5 compares the size of exclusion zones 341 and 342 around a microwave beampath 340 under a HATA loss model (median city suburban assumption). The exclusion zones 341 and 342 for FIG. 5, although derived from a different loss model, are similar in shape to those of FIG. 4.

Because of the particular shape of the exclusion zones 331, 332, 341 and 342 (as illustrated in FIGS. 4 and 5), minimizing interference with microwave communication users may potentially be achieved by avoidance of the microwave beampath 330 or 340. It has thus far, however, been unappreciated that OFS avoidance is more difficult for signals, be they narrowband or spread spectrum signals, exceeding 10 MHz in bandwidth or extending over multiple OFS bands. The reason for such difficulty stems from the fact that approximately 94 percent of all OFS links are 10 MHz links. Thus, while it might be possible to select a 10 MHz band on which to transmit so as to interfere with at most only a single 10 MHz OFS link, any signal wider than 10 MHz could potentially interfere with at least two and possibly more OFS links. This problem is exacerbated by the fact that, in and around many urban areas, OFS microwave beampaths of different frequency bands may not necessarily be parallel but may intersect in a variety of patterns. Thus, the existing geographic pattern of microwave links in most major cities would necessitate that, in many if not most cells (in the case of a cellular system), any signal wider than 10 MHz transmitted in microwave frequency bands would interfere with the beampath of more than one microwave station no matter how much frequency avoidance was employed.

In contrast, the present invention provides in one embodiment means for avoiding or minimizing interference with existing OFS links by selection of a particular frequency bandwidth for spread spectrum communication. In particular, this aspect of the present invention provides for a spread spectrum communication bandwidth that is 10 MHz or less in size. Given a known allocation of frequency bands for OFS users, the present invention in one embodiment allows for selection of a 10 MHz or smaller band for spread spectrum communication so as to avoid the beampath of existing fixed microwave users or, in the worst case, to potentially interfere with only a single microwave communication user. For example, if the selected band for spread spectrum communication is coextensive with or entirely within the bandwidth of a known 10 MHz OFS link, then, because OFS channels are frequency multiplexed, the spread spectrum communication signal can interfere with at most the one known 10 MHz link. Further, the spread spectrum transmitter 1 can be geographically located so as to minimize or avoid interference with that existing OFS link.

Another way in which aspects of the present invention minimize interference with microwave communication users is by using a spread spectrum signal for communication. A spread-spectrum signal with its noise-like characteristics creates much less interference than a narrowband signal of comparable power. Approximately 83% of all OFS links use analog microwave systems which are highly susceptible to narrowband interference. The maximum allowable interference to a microwave receiver is commonly defined by the TSB10E standard as only a 1 dB rise in the receiver's noise threshold. A 10 MHz bandwidth spread spectrum signal may result in 1/100 (20 dB) less interference to an OFS receiver compared with a similar power 100 KHz bandwidth narrowband signal. The difference in interference is illustrated, for example, in FIGS. 4 and 5. FIG. 4 compares the exclusion zone 332 (assuming a 2 GHz microwave transmitter having a directional antenna at a height of 200 feet) of a 100 KHz narrowband signal with the exclusion zone 331 of a 10 MHz spread spectrum signal using a theoretical freespace loss model. The narrowband exclusion zone is 30 to 100 times larger than the spread spectrum exclusion zone. FIG. 5 shows a similar comparison using a HATA loss model (median city suburban assumption).

A further advantage of using a 10 MHz or smaller spread spectrum communication bandwidths is that it provides an easy migration path into the existing bands of OFS users if the OFS users can be relocated to another band.

Information relating to construction of a spread-spectrum communication system using a 10 MHz or less spreading bandwidth and having known center frequencies may be found in detail in the technical appendix incorporated by reference fully herein. The specification, drawings, claims, and the technical appendix, in combination, contain a written description of the invention, and the manner and process of making and using it, in such full, clear, concise and exact terms as to enable any person skilled in the art to make and use the same.

Figure 6:
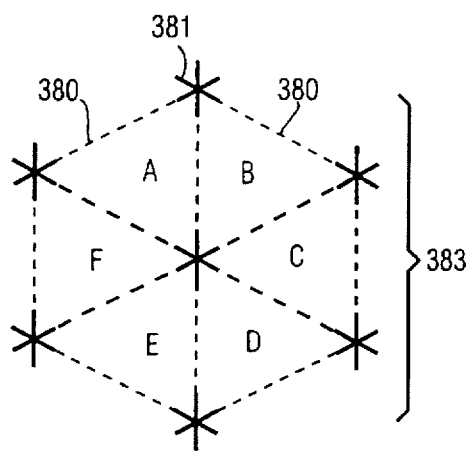
FIG. 6 is a diagram of triangular cells arranged in a grid pattern.

For example, a spread spectrum system for communicating over a 10 MHz or smaller frequency band may be part of a cellular network. The system may comprise a plurality of base stations 381 arranged in an approximately triangular grid 383 covering a service area, as shown in FIG. 6. Regions surrounded by three base stations 381 may comprise triangular cells 380. Each base station 381 may consist of six transmitters, each separately driving a 60° sector antenna. For aesthetic reasons, conformal mount, flat antennas mounted on the sides of buildings may be used in some areas where obtaining zoning for tower mounted antennas is difficult or economically undesirable. Although not required, the frequency of each transmit sector can be different if necessary to minimize interference with existing OFS and PCS services. The data transmission rate may be independently set from cell to cell; that is, different sectors of a base station may transmit at different rates.

Figure 7:
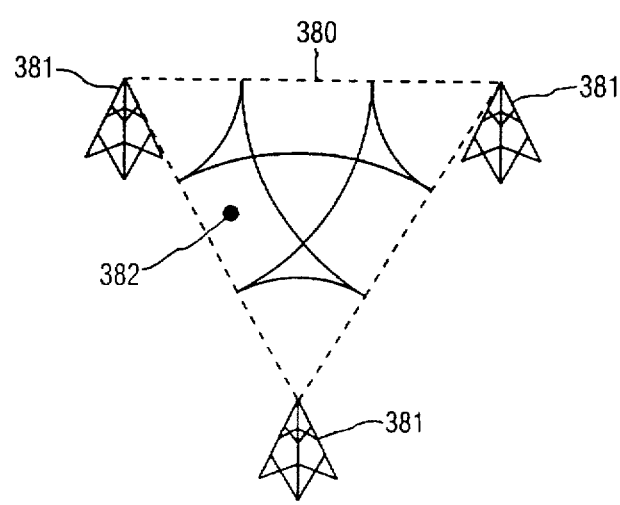
FIG. 7 is a diagram of a triangular cell.

A triangular service cell 380 is shown in FIG. 7. Three base stations 381 having transmitters form the corners of the triangular service cell 380. The base stations 381 send high speed data using appropriate 60° antennas and may also use different spreading codes and/or different frequencies. Because different frequencies may be used, the described system allows for OFS frequency avoidance on a cell sector by cell sector basis. Within the data stream, block interleaving and convolutional encoding may also be used to further mitigate fading and interference effects. An additional low rate base state/sector identifier data stream, unique to each transmitter, is employed to facilitate mobile unit location determination and data transmission query processing.

In one configuration, the data on the outbound transmission in each triangular cell 380 may be different. Because each transmitter can also use a different spreading code, at a receiver 382 the signals can be separated and processed independently prior to data system combining. As shown in FIG. 7, the receiver 382 within a triangular cell 380 may be in a position to receive signals from at least three base stations 381. The receiver 382 independently despreads the three signals, performs soft decision data demodulation, and combines the data streams prior to convolutional decoding. Code based, variable delays may be introduced to synchronize data streams prior to combining.

The base stations 381 may be synchronized using a global positioning system. By including base station position in the data stream, a user can determine his or her location to an accuracy of about 30 feet by measuring pseudorange to each of the three transmitters located at the base stations 381. The user can also obtain timing information within an accuracy of about 30 to 100 nanoseconds.

The above described system employing triple transmission and spread spectrum communication has several important advantages. The system significantly reduces sensitivity to signal shadowing effects caused by buildings, hills, and similar obstacles. The system mitigates multipath fading effects and enhances error correction coding performance. Further, if interference is encountered at one frequency, a signal may be transmitted at a different frequency by one of the other two base stations 381 of the triangular cell 380. Also, the system architecture reduces required transmit power and, consequently, reduces the potential for OFS interference. Low power transmitters (e.g., as low as 100 mW) may be used in regions where OFS interference exists.

When base stations 381 are located close together, the maximum data transmission rate is determined primarily by mutual interference considerations, while at wider separations of base stations 381, the data transmission rate is limited by noise. Even in areas near an OFS user on the same frequency, a triangular grid of transmitters 1 to 2 km apart may provide 600 kbit/s raw data rate at a bit rate error of $10^{-6}$. A compact receiver may be capable of combining multiple simultaneous 1.5 Mbit/s transmissions in a single contiguous 10 MHz band of shared spectrum. The receiver may have the option of selecting any of the available transmission frequencies based on local propagation characteristics and received S/(1+N). A user experiencing good quality reception may request a higher data rate if total traffic warrants.

The system for transmitting spread spectrum signals over a 10 MHz bandwidth may employ time division multiplexing or duplexing in order to separate users. Time separation avoids interference problems, as the interference in any single time slot is simply that created by a single user. Thus, multiple users could share the same 10 MHz bandwidth while creating the interference of only a single continuous user. In contrast, in other systems the aggregate interference per cell typically rises proportionally with the number of users leading to interference problems with OFS and other users sharing the electromagnetic spectrum. Time division multiplexing or duplexing may be combined with frequency division multiplexing or duplexing in order to increase the number of separate users.

Another aspect of the invention relates to a technique for spread-spectrum communication which uses more than one frequency band, particularly frequency bands including the 902–928 MHz, 1850–1990 MHz, and 2.4–2.4835 GHz frequency bands. As noted above, the spread-spectrum signal 6 may be modulated onto a communication channel. The communication channel may be selected from frequencies in one of a plurality of frequency bands, including the 902–928 MHz, 1850–1990 MHz, and 2.4–2.4835 GHz frequency bands, and including the 1910–1930 MHz frequency band or other future unlicensed frequency bands, or other designated frequency bands.

In this aspect of the invention, a spreading bandwidth of 10 MHz may be used, or a different spreading bandwidth which may be more or less than 10 MHz. A different spreading bandwidth may be used from time to time; a different spreading bandwidth may be used for communication in different frequency bands, or for different uses.

In a preferred embodiment, the invention provides for changing the frequency band onto which the spread-spectrum signal 6 is encoded upon a change in environment or other control trigger. For example, the 902–928 MHz and 2.4–2.4835 GHz bands may be used for private access spread-spectrum communication, such as with a PBX, PABX, residential telephone, key system, Centrex system, or other related system, while the 1850–1990 MHz band may be used for public access spread-spectrum communication, such as public telephone access. In a preferred embodiment, a spread-spectrum transmitter 1 may be embodied in a handset 13 and may dynamically switch from one frequency band to another based on whether it is able to access a local PBX or PABX 14 via spread-spectrum communication. In particular, the handset 13 may be capable of switching between the 1850–2200 MHz band and the 2400–2485 MHz band, or between two sub-bands within those bands. In place of the PBX or PABX 14, a related system such as a residential telephone, key system, or Centrex system may be readily substituted. Alternatively, the transmitter 1 may dynamically switch from one frequency band to another based on local propagation characteristics and received S/(1+N).

FIG. 8 shows one possible scheme for dividing the 1850–1990 MHz and 2400–2485 MHz bands into sub-bands of 10 MHz or 5 MHz each. A first bandwidth 400 comprising frequencies from 1850–1930 MHz may be divided into sub-bands 402 of 10 MHz or 5 MHz each. Thus, if the first bandwidth 400 is divided into sub-bands 402 of 10 MHz, then eight channels could be provided, while if divided into sub-bands 402 of 5 MHz, then sixteen channels could be provided. Likewise, a second bandwidth 405 comprising frequencies from 2400–2480 MHz may be divided into sub-bands 406 of 10 MHz or 5 MHz each. A dual mode phone 410 provides access to a select one of the plurality of sub-bands 402 in the first bandwidth 400, and may be switched to provide access to a select one of the plurality of sub-bands 406 in the second bandwidth 405.

While transmitting in a sub-band 402 within the first bandwidth 400, which comprises licensed frequency band to which OFS users would have access, the dual mode phone 410 may transmit using spread spectrum communication taking advantage of CDMA and/or TDMA methods in order to minimize interference with OFS microwave users. If no OFS user is present, the dual mode phone 410 may of course transmit using conventional narrowband techniques. While transmitting in a sub-band 406 within the second bandwidth 405, which comprises unlicensed frequencies available to PCS systems such as PBX, Centrex or other systems, the dual mode phone 410 may transmit using spread spectrum communication taking advantage of CDMA and/or TDMA methods in order to minimize interference with existing users, if any, or may transmit using conventional narrow-band techniques. Thus, the same dual mode phone 410 may access a cellular system, for example, in a first bandwidth 400 but, by operation of a switch, may access a private access network such as a PBX or Centrex in a second bandwidth 405.

Figure 9:
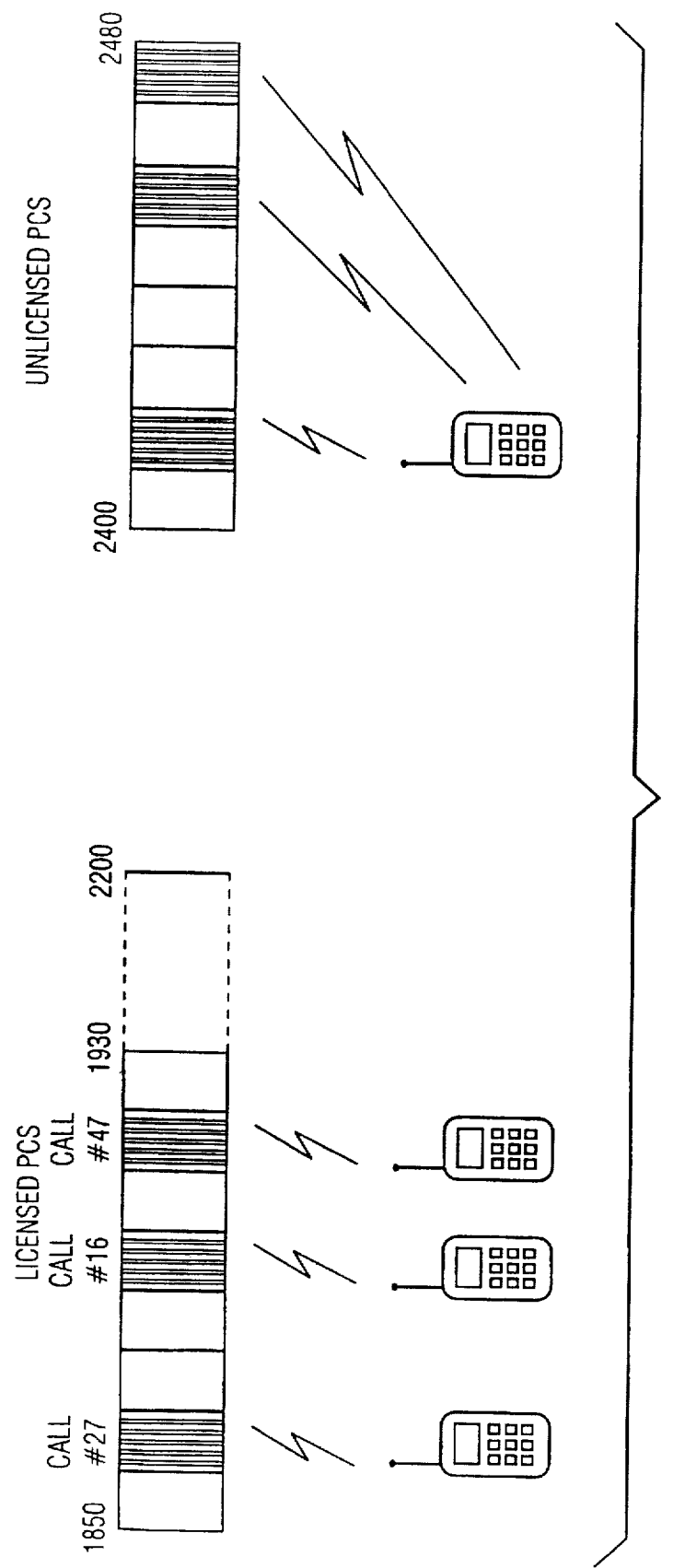

FIG. 9 shows a similar scheme for communicating in either one of two different frequency bands.

Information relating to construction of a spread-spectrum communication system which uses more than one frequency band, particularly frequency bands including the 902–928 MHz, 1850–1990 MHz, and 2.4–2.4835 GHz frequency bands may be found in detail in the technical appendix appended hereto, incorporated by reference herein in its entirety, as well as in the description set forth earlier herein. The specification, drawings, claims, and the technical appendix, in combination, contain a written description of the invention, and the manner and process of making and using it, in such full, clear, concise and exact terms as to enable any person skilled in the art to make and use the same.

Figure 10:
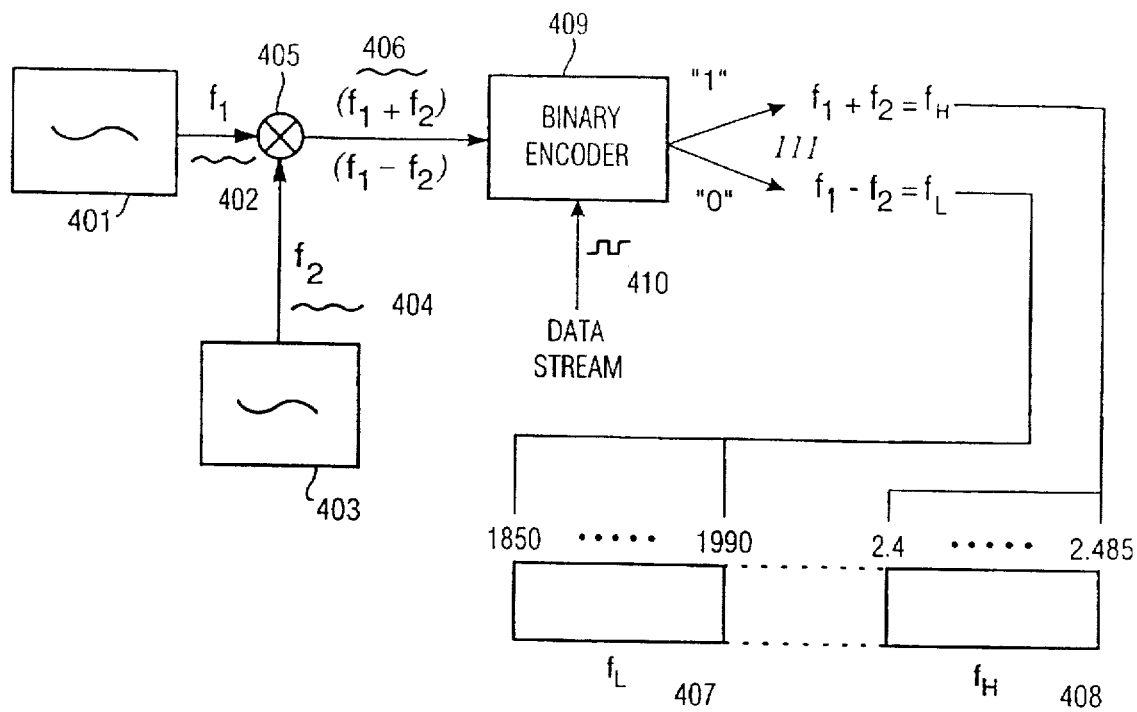
FIG. 10 shows a dual-mode spread-spectrum modulator with two frequency bands.

For example, FIG. 10 shows a dual-mode spread-spectrum modulator with two frequency bands. The dual-band spread-spectrum modulator uses a single, relatively narrow, synthesizer to serve two operating frequency bands. In the lower frequency band, the synthesizer may operate in a high-side injection mode, while in the higher frequency range, the synthesizer may operate in a low-side injection mode. In a preferred embodiment, the lower frequency range may comprise about 1850 to 1990 megahertz, while the higher frequency range may comprise about 2400 to 2483.5 megahertz.

The operation of the device shown in FIG. 10 will now be explained in more detail. A first frequency source 401 may generate a first frequency f1 402, while a second frequency source 403 may generate a second frequency f2 404. The first frequency f1 402 and the second frequency f2 404 may be coupled to a multiplier 405, which may generate a bimodal signal 406 with a frequency distribution over two frequency ranges fL 407 and fH 408. In a preferred embodiment, the lower of the two frequencies fL 407 (fL=f1−f2) may range from about 1850 to 1990megahertz, while the higher of the two frequencies fH 408 (fH=f1+f2) may range from about 2400 to 2483.5 megahertz. When one of the two frequencies f1 and f2, e.g., f2 is chosen between the two ranges, e.g., about 2200 megahertz, the other frequency, e.g., f1 may be chosen between about 300 and 440 megahertz.

The bimodal signal 406 may be coupled to a binary encoder 409, for encoding a data stream 410. The data stream 410, comprising a sequence of data bits 411, may be coupled to the binary encoder 409, which may generate a first frequency, e.g., fL 407, when a data bit 411 in the data stream 410 is a "0" bit, and may generate a second frequency, e.g., fH 408, when a data bit 411 in the data stream 410 is a "1" bit.

The present invention also provides for monitoring a frequency in each band (or transmitting to a frequency in each band) at once, because both (f1+f2) and (f1−f2) can be stepped down to the same intermediate frequency with a single local oscillator. When the intermediate frequency is 260 MHz and the local oscillator is set to 2180 MHz, the present invention allows operation at both 1920 MHz and 2440 MHz. When the local oscillator is set 10 MHz greater, the present invention then allows operation at both 1930 MHz and 2450 MHz, i.e., two frequencies each 10 MHz greater. Thus, for paired frequencies, the present invention allows reception or transmission on either frequency (or both) in the pair.

Figure 11:
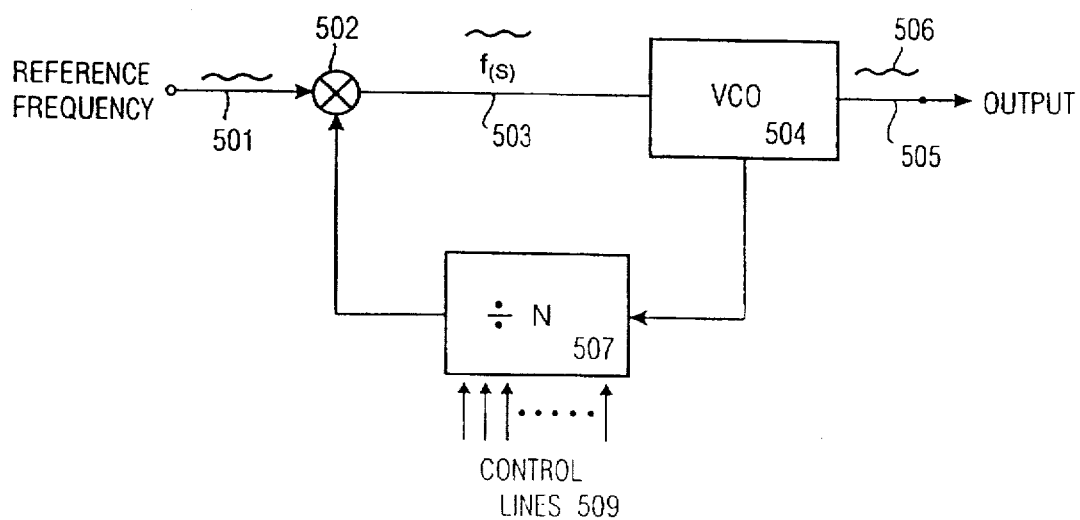
FIG. 11 shows a programmable frequency generator.

FIG. 11 shows a programmable frequency generator.

A reference frequency signal 501 may be coupled to a multiplier 502. The multiplier 502 may generate a signal f(s) 503, which may be coupled to a voltage-controlled oscillator (VCO) 504. The VCO 504 may be coupled to an output node 505, which provides an output frequency signal 506, and may also be coupled in a feedback configuration to the multiplier 502 by way of a programmable divide-by-N counter 507. The programmable divide-by-N counter 508 may be programmed by a set of control lines 509. In one embodiment, the divide-by-N range of the programmable divide-by-N counter 507 comprises 23 steps, from 205 to 234.

Figure 12:
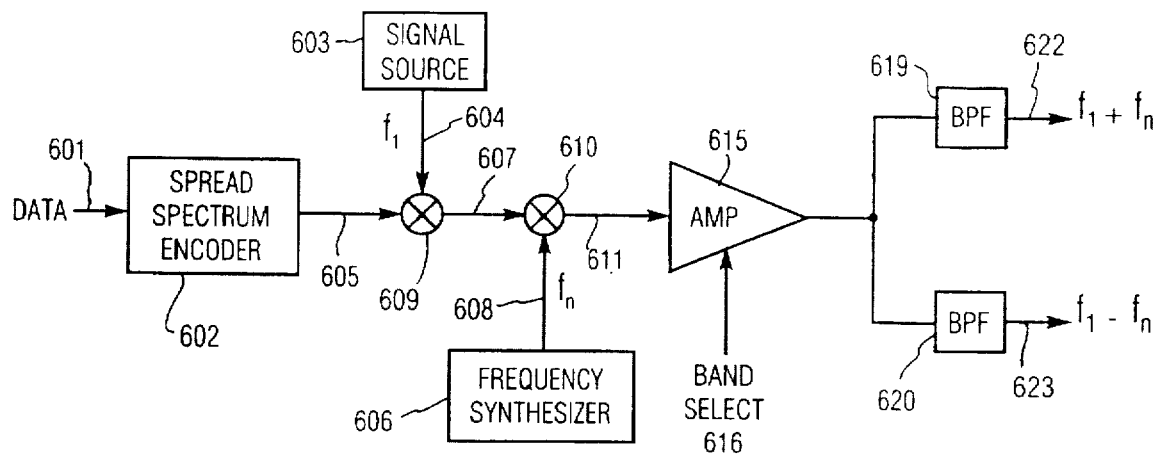
FIG. 12 is a block diagram showing an alternative embodiment of a transmitter using a single frequency synthesizer for communicating over a plurality of frequency bands.

FIG. 12 is an alternative embodiment of a transmitter using a single frequency synthesizer for communicating over a plurality of frequency bands. In FIG. 12, an incoming data stream 601 to be modulated is provided to a spread spectrum encoder 602, which encodes the data stream 601 and outputs a spread spectrum signal 605. The spread spectrum encoder 602 may encode the data stream 601 by modulating it with a PN code, or by employing an M-ary spread spectrum technique. The spread spectrum signal 605 is connected to a modulator 609. A carrier signal having a frequency f1 is generated from a signal source 603 and is also connected to modulator 609. Modulator 609 outputs a modulated spread spectrum signal 607.

The modulated spread spectrum signal 607 is connected to another modulator 610. A frequency synthesizer 606 (e.g., such as shown in FIG. 11) generates a programmable frequency signal 608, which is also connected to the modulator 610. The programmable frequency signal 608 has a center frequency of fn, which may be programmed by control lines 509 such as shown, for example, in FIG. 11. Modulator 610 outputs a bimodal signal 611 having frequency components at frequencies f1+fn and f1−fn.

The bimodal signal 611 is connected to a wideband amplifier 615. The wideband amplifier 615 is controlled by a band select signal 616, which causes the wideband amplifier 615 to perform at an operating point tailored for either the frequency f1+fn or the frequency f1−fn. An output of the wideband amplifier 615 is connected to two bandpass filters 619 and 620. One bandpass filter 619 has a center filtering frequency of f1+fn, and the other bandpass filter 620 has a center filtering frequency of f1−fn. The first bandpass filter 619 passes the portion of the amplified signal having frequency components at f1+fn while attenuating the frequency components at f1−fn, and the second bandpass filter 620 passes the portion of the amplified signal having frequency components at frequency f1−fn while attenuating the frequency components at frequency f1+fn. Bandpass filter 619 outputs an output signal 622 having a frequency f1+fn, while bandpass filter 620 outputs an output signal 623 having a frequency f1+fn.

Figure 15:
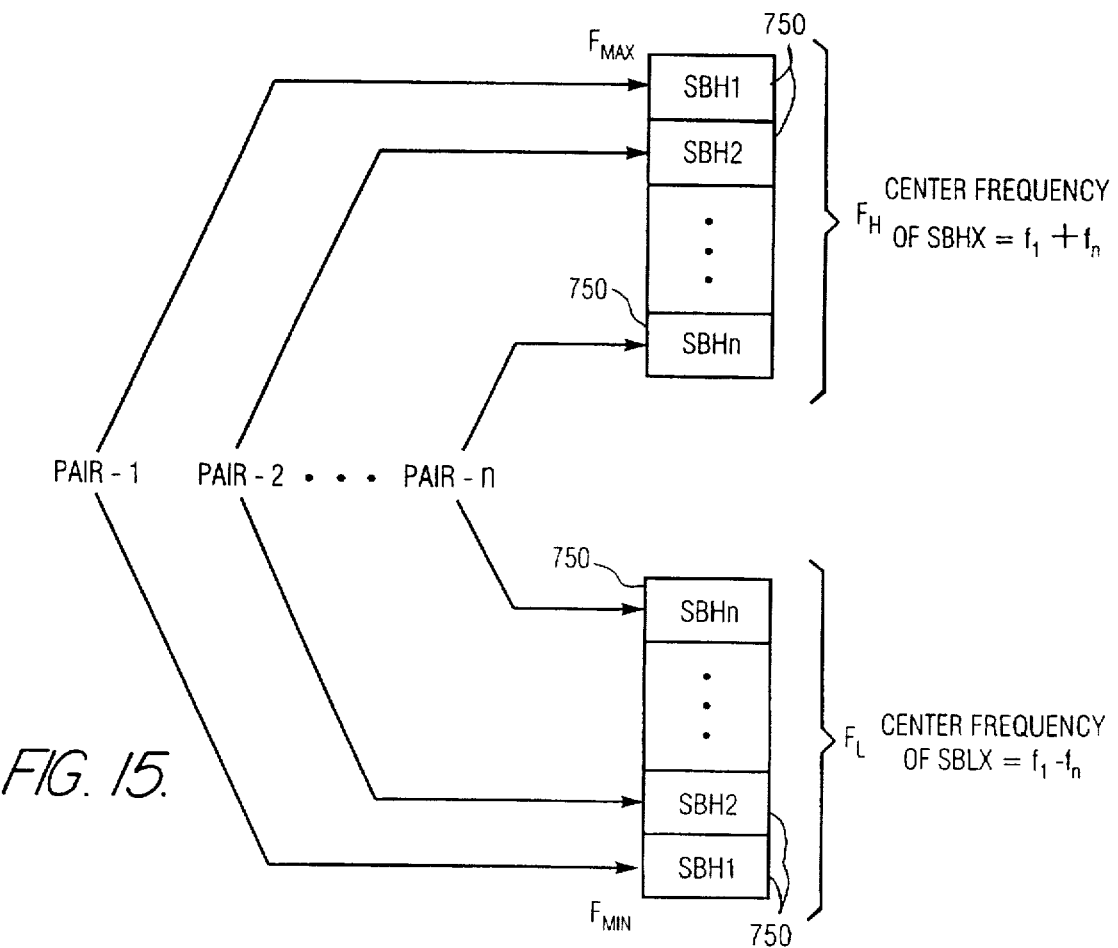
FIG. 15 is a diagram of frequency bands and sub-bands illustrating frequency pairs that may be generated by the transmitters shown in FIGS. 11, 12 or 13.

Thus, the FIG. 12 transmitter allows generation and transmission, using a single frequency synthesizer 606, of a signal in either or both of two frequency bands, wherein the frequency f1+fn lies in one frequency band and the frequency f1−fn lies in the other frequency band. FIG. 15 is a diagram of frequency bands and sub-bands illustrating frequency pairs that may be generated for a selected f1 and fn. In FIG. 15, a pair of frequency bands $F_H$ and $F_L$ are each divided into a plurality of sub-bands 750. The higher frequency band $F_H$ is divided into sub-bands SBH1, SBH2, ... SBHN, while the lower frequency band $F_L$ is divided into sub-bands SBL1, SBL2, . . . SBLN. The sub-bands SBH1 . . . SBHN and SBL1 . . . SBLN are paired, with the highest of the sub-bands SBH1 in the high frequency band $F_H$ paired with the lowest of the sub-bands SBL1 in the low frequency band $F_L$, the second highest of the sub-bands SBH2 in the high frequency band $F_H$ paired with the second lowest of the sub-bands SBL2 in the low frequency band $F_L$, and so on, until the lowest of the sub-bands SBHN in the high frequency band $F_H$ is paired with the highest of the sub-bands SBLN in the low frequency band $F_L$, thereby resulting in frequency pairs PAIR-1, PAIR-2, . . . PAIR-N. The high frequency band $F_H$ may comprise all or a portion of the band ranging from 1850 MHZ to 1990 MHZ, while the low frequency band $F_L$ may comprise all or a portion of the band ranging from 2.4 MHZ to 2.485 MHZ. The sub-bands SBH1 . . . SBHN and SBL1 . . . SBLN need not be contiguous within each of the main frequency bands $F_L$ and $F_H$.

In operation, the programmable frequency synthesizer 606 is programmed to select a frequency fn, preferably selected from one of a discrete group of N frequencies corresponding to the frequency pairs PAIR-1, PAIR-2, . . . PAIR-N. The largest selected fn allows operation over the frequency sub-band pair denoted PAIR-1, while the smallest selected fn allows operation over the frequency sub-band pair denoted PAIR-N, with the frequency selections for fn between the smallest and largest values of fn corresponding to frequency pairs PAIR-2 through PAIR-(N-1). Thus, by changing the frequency fn in discrete steps, the transmitter of FIG. 12 can be operated over a different pair of frequency sub-bands 750.

While the FIG. 12 embodiment is described with the frequency f1 greater than frequency fn, it is also possible to have frequency fn be greater than frequency f1. In such a case, the relative frequency difference between the higher frequency signal at a frequency fn+f1 and the lower frequency signal at a frequency fn−f1 will be a constant 2·f1 as the frequency fn is varied according to control lines 509 or other programming means.

Figure 13:
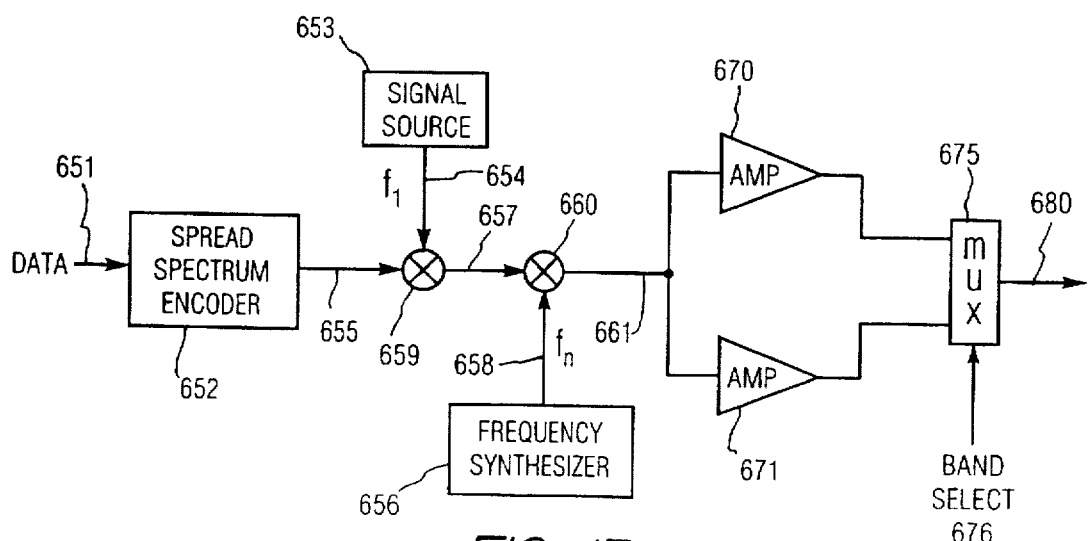
FIG. 13 is a block diagram showing another alternative embodiment of a transmitter using a single frequency synthesizer for allowing communication over a plurality of frequency bands.

FIG. 13 is another embodiment of a transmitter using a single frequency synthesizer for allowing communication over a plurality of frequency bands. In FIG. 13, a data stream 651 is encoded by a spread spectrum encoder 652 in a similar manner to FIG. 12. A spread spectrum signal 655 output from the spread spectrum encoder 652 is modulated with a carrier signal 654 from a signal source 653 by modulator 659. The carrier signal 654 has a frequency f1. The modulator output 657 is connected to another modulator 660. A frequency synthesizer 656 (e.g., such as the one shown in FIG. 11) generates a programmable frequency signal 658, which is also connected to the modulator 660. The programmable frequency signal 658 has a center frequency of fn, which may be programmed by control lines 509 such as, for example, shown in FIG. 11. Modulator 660 outputs a bimodal signal 611 having frequency components at frequencies f1+fn and f1−fn.

The bimodal signal 661 is connected to two narrowband power amplifiers 670 and 671. One narrowband power amplifier 670 is configured to operate at a frequency of f1+fn, while the other narrowband power amplifier 671 is configured to operate at a frequency f1−fn. Outputs from each of the narrowband power amplifiers 670 and 671 are provided to an analog multiplexer 675 (or a set of switches), which selects one of the two outputs from amplifiers 670 and 671 in response to a band select signal 676. The multiplexer 675 may be configured so that it selects one or both of the amplifier outputs, thereby allowing operation over a single frequency band or two frequency bands, and in either case using a single frequency synthesizer 656. The FIG. 13 transmitter operates over paired frequency sub-bands SBH1 . . . SBHN and SBL1 . . . SBLN (see FIG. 15) in a manner similar to the FIG. 12 transmitter, depending on the frequency fn selected for the programmable frequency signal 658.

Figure 14:
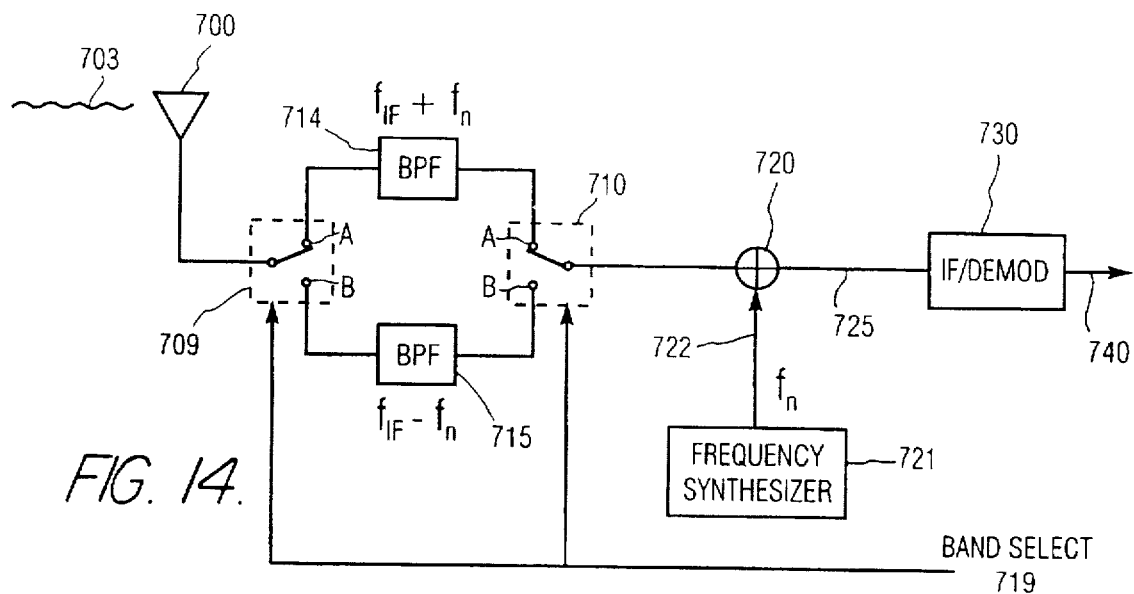
FIG. 14 is a block diagram of a receiver using a single frequency synthesizer for demodulating signals that may be sent over more than one frequency band.

FIG. 14 is a block diagram of a receiver for receiving and demodulating signals that may be sent over two frequency bands. In the FIG. 14 receiver, a transmitted signal 703 is received by an antenna 700 and provided to a switch 709. In one position A, the switch 709 connects to a first bandpass filter 714 having a center filtering frequency of $f_{IF}$+fn, while in another position B, the switch 709 connects to a second bandpass filter 715 having a center filtering frequency of $f_{IF}$−fn. In a preferred embodiment, frequency $f_{IF}$ is selected as frequency f1 used in the transmitter.

Outputs from each of the bandpass filters 714 and 715 are connected to another switch 710. In a first position A, the switch 710 connects to the first bandpass filter 714, while in another position B, the switch 710 connects to the second bandpass filter 715.

Switches 709 and 710 are controlled by a band select signal 719. When the switches 709 and 710 are set in position A, the FIG. 14 receiver is configured to detect signals sent over a frequency band centered at $f_{IF}$+fn, and when the switches 709 and 710 are set in position B, the receiver is configured to detect signals sent over a frequency band centered at $f_{IF}$−fn. While two switches 709 and 710 are shown in FIG. 14, the same result may be achieved by using only a single switch 709 or 710. A variety of other selection means could also be utilized.

The output from switch 710 is connected to a multiplier 720. A frequency synthesizer 721 generates a programmable frequency signal 722 having a frequency fn. The programmable frequency signal 722 is also connected to the multiplier 720. The frequency fn is selected to match the desired frequency sub-band pair PAIR-1, PAIR-2, . . . or PAIR-N, and therefore can monitor either of the two sub-bands 750 comprising the pair, depending on the setting of the band select signal. By switching the frequency fn of the programmable frequency signal 722, the FIG. 14 receiver can be adjusted to monitor two other frequency sub-bands 750. The sub-bands 750 that can be monitored by changing frequency fn have the same pattern as shown in FIG. 15—that is, the highest sub-band SBH1 in the high frequency band $F_H$ is paired with the lowest sub-band SBH1 in the low frequency band $F_L$, and the lowest sub-band SBHN in the high frequency band $F_H$ is paired with the highest sub-band SBLN of the low frequency band FL.

By replacing switches 709 and 710 with a connection to both the A and B positions, the FIG. 14 receiver can be modified to simultaneously monitor two frequency bands, i.e., the frequency bands centered at frequencies $f_{IF}$+fn and $f_{IF}$−fn.

Multiplier 720 outputs a downconverted signal 725. The downconverted signal 725 is provided to an IF/demodulation block 730, which demodulates the downconverted signal 725 to recover the original information modulated thereon. The demodulation block 730 operates at the frequency $f_{IF}$ (i.e., f1), and may comprise a frequency source for generating a frequency f1, and/or a spread spectrum decoder and demodulator.

As with the dual-band transmitters previously described, the frequency fn in the dual-band receiver of FIG. 14 may be selected as larger than the frequency f1, in which case the bandpass filter 714 may be configured to have a center filtering frequency of fn+$f_{IF}$, and bandpass filter 715 may be configured to have a center filtering frequency of $fn-f_{IF}$. Thus, the frequency sub-bands to be monitored would be separated by a fixed $2 \cdot f_{IF}$ as the frequency fn is varied among its programmable frequency values.

Alternative Embodiments

While preferred embodiments are disclosed herein, many variations are possible which remain within the concept and scope of the invention, and these variations would become clear to one of ordinary skill in the art after perusal of the specification, drawings and claims herein.

For example, information which is encoded for transmission is occasionally referred to herein as "data", but it would be clear to those of ordinary skill in the art, after perusal of this application, that these data could comprise data, voice (encoded digitally or otherwise) error-correcting codes, control information, or other signals, and that this would be within the scope and spirit of the invention.

What is claimed is:

1. An apparatus for multi-band multi-mode communication comprising:
   a transmitter having a plurality of transmission modes and a plurality of modulators;
   a receiver having a plurality of demodulators;
   a first and second mode selection signal coupled respectively to said transmitter and said receiver;
   a first and second filter coupled respectively to said plurality of modulators and to said plurality of demodulators; and
   said plurality of modulators comprising a spread spectrum modulator and a narrowband modulator, wherein said transmitter is capable of transmitting a spread spectrum signal and a narrowband signal.

2. The apparatus of claim 1 further comprising a plurality of reception modes comprising a communications protocol selected from the group consisting of: AMPS, GSM, IS-45, IS-95 and DECT.

3. The apparatus of claim 1 further comprising a plurality of input and output frequency bands comprising a frequency band which spans from 2400 megahertz to 2483.5 megahertz.

4. The apparatus of claim 1 further comprising a plurality of input and output frequency bands comprising a frequency band which spans from 1850 megahertz to 1990 megahertz.

5. The apparatus of claim 1 wherein said receiver and transmitter are co-located in a mobile handset.

6. The apparatus of claim 1 wherein said plurality of transmission and reception modes comprise a cellular mode.

7. The apparatus of claim 1 wherein said plurality of transmission and reception modes comprise a microcellular mode.

8. The apparatus of claim 1 wherein said plurality of transmission modes comprises a communications protocol selected from the group consisting of: AMPS, GSM, IS-45, IS-95 and DECT.

9. The apparatus of claim 1 further comprising a paging unit.

10. An apparatus for multi-band multi-mode communication comprising:
    a transmitter comprising
       a first tunable frequency source;
       a plurality of modulators coupled to said first tunable frequency source, said plurality of modulators comprising a plurality of transmission modes;
       a first mode selection signal coupled to each of said plurality of modulators;
       a first filter coupled to an output of each of said plurality of modulators;
       said plurality of modulators comprising a spread spectrum modulator and a narrowband modulator and said transmitter is capable of transmitting a spread spectrum signal and a narrowband signal; and
    a receiver comprising
       a second filter;
       a second tunable frequency source;
       a frequency converter coupled to said second filter and coupled to said second tunable frequency source;
       a plurality of demodulators coupled to said frequency converter, said plurality of demodulators comprising a plurality of reception modes
       a second mode selection signal coupled to each of said plurality of demodulators.

11. The apparatus of claim 10 wherein said plurality of demodulators comprise a spread spectrum demodulator and a narrowband demodulator.

12. The apparatus of claim 10 wherein the apparatus is a mobile handset.

13. The apparatus of claim 10 further comprising a mode select switch which selects one of said plurality of transmission modes.

14. The apparatus of claim 10 further comprising a mode select switch which selects one of said plurality of reception modes.

15. The apparatus of claim 10 wherein said transmitter further comprises a power amplifier coupled to said plurality of modulators, said power amplifier adjustable to operate in each of said plurality of transmission modes.

16. The apparatus of claim 10 wherein at least one of said first and second tunable frequency sources comprises a programmable frequency synthesizer.

17. The apparatus of claim 16 wherein said programmable frequency synthesizer comprises:
    a reference frequency signal source;
    a programmable divide-by-N counter;
    a multiplier having inputs coupled to said programmable divide-by-N counter and said reference frequency signal course; and
    a voltage-controlled oscillator having an input coupled to said multiplier, said voltage-controlled oscillator having an output coupled to said programmable divide-by-N counter.

18. The apparatus of claim 10 wherein said first and second tunable frequency sources are the same component shared between said transmitter and said receiver.

19. The apparatus of claim 10 wherein said first and second filters are the same component shared between said transmitter and said receiver.

20. The apparatus of claim 10 wherein said first filter is capable of passing a signal in each of said plurality of transmission modes.

21. The apparatus of claim 10 wherein said second filter is capable of passing a signal in each of said plurality of reception modes.

22. The apparatus of claim 10 wherein said first and second filters comprise center filtering frequencies in a plurality of frequency bands.

23. The apparatus of claim 10 wherein at least one of said first and second filters comprises an adjustable bandpass filter.

24. The apparatus of claim 10 wherein said first filter comprises a plurality of narrowband power amplifiers in parallel, said plurality of narrowband power amplifiers coupled to a multiplexer.

25. The apparatus of claim 10 wherein at least one of said first and second filters comprises a plurality of bandpass filters in parallel.

* * * * *